(12) United States Patent
Shah

(10) Patent No.: US 10,447,658 B2
(45) Date of Patent: Oct. 15, 2019

(54) SYSTEM AND METHOD FOR PROVIDING IMPROVED OPTIMIZATION FOR SECURE SESSION CONNECTIONS

(71) Applicant: Citrix Systems, Inc., Fort Lauderdale, FL (US)

(72) Inventor: Paras Suresh Shah, Sunnyvale, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 709 days.

(21) Appl. No.: 15/004,598

(22) Filed: Jan. 22, 2016

(65) Prior Publication Data
US 2017/0214660 A1    Jul. 27, 2017

(51) Int. Cl.
*H04L 29/06* (2006.01)
*H04L 29/08* (2006.01)

(52) U.S. Cl.
CPC ...... *H04L 63/0428* (2013.01); *H04L 63/0272* (2013.01); *H04L 63/0281* (2013.01);
(Continued)

(58) Field of Classification Search
CPC ... H04L 63/0281; H04L 63/029; H04L 63/08; H04L 67/28
See application file for complete search history.

(56) References Cited

U.S. PATENT DOCUMENTS

| | | | | |
|---|---|---|---|---|
| 8,438,628 B2 * | 5/2013 | Shah | ............... | H04L 63/0428 380/255 |
| 9,647,835 B2 * | 5/2017 | Gero | ............... | H04L 9/0825 |

(Continued)

OTHER PUBLICATIONS

Freier, A. et al.; "The Secure Sockets Layer (SSL) Protocol Version 3.0"; Internet Engineering Task Force, Request for Comments: 6101; Aug. 2011; 67 pages; The Internet Society.
(Continued)

*Primary Examiner* — Daniel B Potratz
(74) *Attorney, Agent, or Firm* — Allen, Dyer, Doppelt + Gilchrist, PA

(57) ABSTRACT

A system for optimizing network traffic is described. The system includes a plurality of appliances. An appliance comprises one or more network interfaces and a secure session connection optimizer module. The one or more network interfaces are configured to facilitate secure communications between a client device and a server, wherein the secure communications involve a plurality of secure session connections comprising a first secure session connection between the client device and the appliance and a second secure session connection between the appliance and another appliance. The secure session connection optimizer module is configured to receive a secure session connection request from the client device, determine, using information from the secure session connection request, whether a lookup table includes information that client authentication is required by the server, if the information indicates that client authentication is not required by the server, provide an instruction to the other appliance, and if the information indicates that client authentication is required by the server, provide the secure connection request to the other appliance over the second secure connection.

54 Claims, 14 Drawing Sheets

(52) U.S. Cl.
CPC ........ *H04L 63/061* (2013.01); *H04L 63/0823* (2013.01); *H04L 63/166* (2013.01); *H04L 67/42* (2013.01); *H04L 67/28* (2013.01)

(56) References Cited

U.S. PATENT DOCUMENTS

| | | | | |
|---|---|---|---|---|
| 2006/0021004 | A1* | 1/2006 | Moran | H04L 63/08 726/2 |
| 2008/0307219 | A1* | 12/2008 | Karandikar | H04L 63/166 713/153 |
| 2010/0098092 | A1* | 4/2010 | Luo | H04L 12/4633 370/401 |
| 2011/0264905 | A1* | 10/2011 | Ovsiannikov | H04L 29/08792 713/151 |
| 2014/0020078 | A1* | 1/2014 | Canning | H04L 63/0815 726/8 |

OTHER PUBLICATIONS

Dierks, T. et al.; "The TLS Protocol Version 1.0"; Network Working Group, Request for Comments: 2246; Jan. 1999; 80 pages; The Internet Society.

* cited by examiner

| ENTRY A (SERVER IP ADDRESS : PORT NUMBER) 1310 | SPLIT PROXY MODE 1320 | Y/N 1321 |
| --- | --- | --- |
| | TRANSPARENT MODE 1330 | Y/N 1331 |
| | CLIENT AUTHENTICATION REQUIREMENT 1340 | Y/N 1341 |
| | PROXY CERTIFICATE (IF SPLIT PROXY MODE) 1350 | SnX93-bPjgqw 1351 |
| | PREMASTER SECRET, PMS (IF SPLIT PROXY MODE) 1360 | 28739...29387 [48 BYTES RANDOM NUMBERS] 1361 |

SYSTEM AND METHOD FOR PROVIDING IMPROVED OPTIMIZATION FOR SECURE SESSION CONNECTIONS

BACKGROUND

A middlebox is a network appliance that manipulates Internet traffic by optimizing data flow across the network. Middleboxes can be configured as wide area network ("WAN") optimizers and can be deployed in pairs across two geographically separated locations to optimize data traffic between the two middleboxes. Middleboxes can be connected through a single link or multiple links such as a leased line link and a broadband link. Middleboxes, which may be called WAN optimizers, can work as a pair of devices with a primary job of optimizing the network traffic and providing better user experience.

For high availability networks, it is common to establish secure connections between two end point entities, for example between a client device and a web server. One or more middleboxes can be deployed between the two end point entities. A middlebox can establish secure session connections with a client device, a server, or another middlebox, for example, using secure session layer (SSL) or a transport layer security (TLS) handshake protocol. Middleboxes can act either passively or actively. For example, a middlebox can passively act by just receiving any data from client device, server, or another appliance, and forwarding them to the next destination (e.g., client device, server, or another appliance). In this scenario, a middlebox does not play a significant role in contributing system optimization. When active, however, the middlebox can perform more than just receiving and forwarding of data. For example, the middlebox can modify communications received from client device, server, or another appliance and send the modified communication to the next destination (e.g., client device, server, or another appliance).

SUMMARY

In some aspects, a system for optimizing network traffic is described. The system includes a plurality of appliances. An appliance can comprise one or more network interfaces and a secure session connection optimizer module. The one or more network interfaces are configured to facilitate secure communications between a client device and a server, wherein the secure communications involve a plurality of secure session connections comprising a first secure session connection between client device and appliance and a second secure session connection between appliance and another appliance. The secure session connection optimizer module is configured to receive a secure session connection request from client device, determine, using information from the secure session connection request, whether a lookup table includes information that client authentication is required by the server, if the information indicates that client authentication is not required by the server, provide an instruction to the other appliance, and if the information indicates that client authentication is required by the server, provide the secure connection request to the other appliance over the second secure connection.

In another aspect, a method can comprise facilitating secure communications between a client device and a server, wherein the secure communications involve a plurality of secure session connections comprising a first secure session connection between the client device and the appliance and a second secure session connection between the appliance and another appliance, receiving a secure session connection request from the client device, determining, using information from the secure session connection request, whether a lookup table includes information that client authentication is required by the server; if the information indicates that client authentication is not required by the server, providing an instruction to the other appliance, and if the information indicates that client authentication is required by the server, providing the secure connection request to the other appliance over the second secure connection.

In yet another aspect, non-transitory computer readable storage medium is described. The storage medium stores a set of instructions that are executable by at least one processor of an appliance to cause the appliance to perform a method. The method can comprises facilitating secure communications between a client device and a server, wherein the secure communications involve a plurality of secure session connections comprising a first secure session connection between the client device and the appliance and a second secure session connection between the appliance and another appliance, receiving a secure session connection request from the client device, determining, using information from the secure session connection request, whether a lookup table includes information that client authentication is required by the server; if the information indicates that client authentication is not required by the server, providing an instruction to the other appliance, and if the information indicates that client authentication is required by the server, providing the secure connection request to the other appliance over the second secure connection.

BRIEF DESCRIPTION OF THE DRAWINGS

Reference will now be made to the accompanying drawings showing example embodiments of this disclosure. In the drawings:

FIG. 13 is exemplary entry information in a lookup table, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide improved optimization for secure session connections. The improved optimization can be realized by implementing a lookup table that stores information necessary to facilitate establishment of secure session connections in a network. There can be a plurality of secure session connections involved to realize end-to-end secure communications, while providing optimization in a network. To provide improved optimization, an intermediary network comprising a plurality of appliances can be deployed between a client device and a server. Assuming that a secure session connection is established from the client device to the server and optimization is performed by an intermediary network comprising a plurality of appliances, there can be at least three segments of secure session connections established between the client device and the server, for example, a first secure session connection between the client device and the first appliance, a second secure session connection between the first appliance and the second appliance in the intermediary network, and a third secure session connection between the second appliance and the server. The lookup table can be implemented in or out of appliance in the intermediary network. When an initial full secure session handshake is performed, certain information, such as, a certificate and a premaster secret can be stored in the lookup table and reused for subsequent secure session handshake. This will decrease a number of signaling transactions during the handshake procedure and thus can lower a number of the Round Trip Time (RTT) in a network (e.g., WAN).

Figure 1:
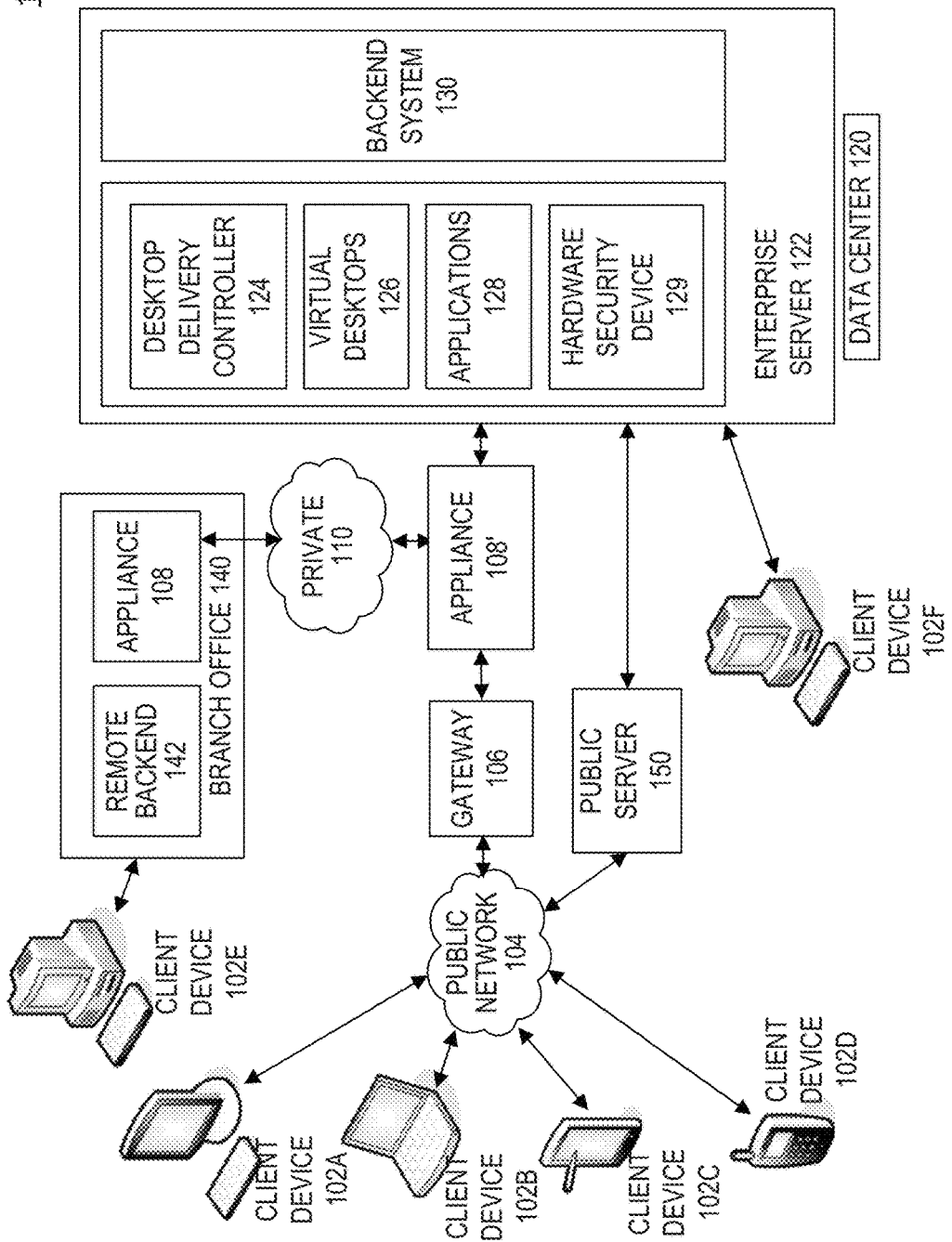
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, public network 104, gateway 106, an appliance 108 or 108', a private network 110, a data center 120, a branch office 140, and a public server 150.

One or more client devices 102 are devices that can acquire remote services from data center 120 through various means. Client devices 102 can communicate with data center 120 either directly (e.g., client device 102F) or indirectly through public network 104 (e.g., client devices 102A-D) or private network 110 (e.g., client device 102E). When client device 102 communicates through public network 104 or private network 110, a communication link can be established. For example, a link can be established by public network 104, gateway 106, and appliance 108', thereby providing a client device (e.g. client devices 102A-D) access to data center 120. A link can also be established by appliance 108 in branch office 140, private network 110, and appliance 108', thereby providing a client device (e.g. client device 102E) access to data center 120. While client devices 102 are portrayed as a computer (e.g., client devices 102A, 102E, and 102F), a laptop (e.g., client device 102B), a tablet (e.g., client device 102C), and a mobile smart phone (e.g., client device 102D), it is appreciated that client device 102 could be any type of device (e.g., wearable or smart watch) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliance 108 and/or data center 120 can understand and vice versa.

Appliance 108 is a device that optimizes wide area network (WAN) traffic by including, for example, a secure session connection optimizer module. In some embodiments, appliance 108 optimizes other types of network traffic, such as local area network (LAN) traffic, metropolitan area network (MAN) traffic, or wireless network traffic.

Appliance 108 can receive a secure session connection request from client device 102. Appliance 108 can determine, using information from the secure session connection request, whether a lookup table (e.g., lookup table 1300 in FIG. 13) includes information that client authentication is required by a server (e.g., public server 150 or enterprise server 122). Appliance 108 can use that information from the secure session connection request, for example, client device ID, in order to check the lookup table. Appliance 108 can maintain the lookup table, for example, by adding and deleting one or more entries, and storing, modifying, and deleting information on the one or more entries. The lookup table can be located in appliance 108 or out of appliance 108. If the lookup table is externally located, appliance 108 can gain access to the lookup table in order to check information stored in the lookup table. Appliance 108 can retrieve at least one of mode information, client authentication requirement, certificate information, and premaster secret information from the lookup table or the other appliance 108'. When retrieving the mode information from the other appliance 108', appliance 108 can store the at least one of mode information in an entry of the lookup table. Appliance 108 can check if there is an entry based on an IP address and a port number of the server in the lookup table. If not existing, appliance 108 can create an entry into the lookup table and the entry is distinguished based on an IP address and a port number of the server.

Appliance 108 can act as a split proxy mode when client authentication is not required by the server. Appliance 108 can also act in a transparent mode when client authentication is required by the server. If the information from the lookup table indicates that client authentication is not required by the server, appliance 108 can provide an instruction to the other appliance 108'. The instruction can include that the other appliance 108' should initiate a secure session handshake with the server, for example, by sending client hello message to the server and establishing a secure session connection with the server. When client authentication is not required by the server or when appliance 108 operates in split proxy mode, appliance 108 can play an active role to optimize signalling transactions with another appliance 108', for example, by providing an instruction to the other appliance 108' to initiate a secure session handshake procedure between the other appliance 108' and the server. If the information indicates that client authentication is required by the server, appliance 108 can provide the secure connection request to the other appliance over the second secure connection at step 1040.

When client authentication is required by the server or when appliance 108 operates in transparent mode, appliance 108 can play a passive role, for example, by receiving or sending any data or messages transmitted between client device 102 and the other appliance 108'.

Appliance 108 can also perform encrypting or decrypting any data or messages transmitted between client device 102 and the other appliance 108'. For example, appliance 108 can perform decrypting any data or messages received from client device 102 using a shared key with client device 102 (e.g, shared key $K_c$), encrypting the decrypted data or messages using another shared key with the other appliance 108' (e.g, shared key $K_t$), and sending the encrypted data or messages to the other appliance 108'. Appliance 108 can also perform decrypting any data or messages received from the other appliance 108' using shared key $K_t$ with the other appliance 108', encrypting the decrypted data or messages using shared key $K_c$ with client device, and sending the encrypted data or messages to client device 102.

If appliance 108 fails to check the lookup table or to determine that the lookup table includes split mode and proxy certificate information, appliance 108 can forward the secure session connection request to the other appliance 108'. During the secure session handshake procedure, appliance 108' can receive a client key exchange (CKE) which has been encrypted by client device 102, appliance 108 can send a request to decrypt the encrypted client key exchange (CKE) to the other appliance 108' so that the other appliance 108' decrypts the encrypted client key exchange (CKE) using a private key. Appliance 108 can receive the decrypted client key exchange (CKE) from the other appliance 108', and then obtain the premaster secret information as the client key exchange (CKE) has the premaster secret information. Appliance 108 can store the premaster secret information for future reuse in an entry of the lookup table.

Appliance 108 can optimize network traffic by, for example, scheduling data packets in an established communication link so that the data packets can be transmitted or dropped at a scheduled time and rate. In some embodiments, appliance 108 is a physical device, such as Citrix System's ByteMobile™, Netscaler™, or CloudBridge™. In some embodiments, appliance 108 can be a virtual appliance. In some embodiments, appliance can be a physical device having multiple instances of virtual machines (e.g., virtual Branch Repeater). A first appliance (e.g., appliance 108) can work in conjunction with or in cooperation with a second appliance (e.g., appliance 108') to optimize network traffic. For example, the first appliance can be located between branch office (e.g., branch office 140) and a WAN connection, while the second appliance can be located between the WAN and a corporate LAN (e.g., data center 120). In some embodiments, the functionality of gateway 106 and appliance 108' can be located in a single physical device. Moreover, in some embodiments, appliance 108' and gateway 106 can be part of the same device. Appliances 108 and 108' can be functionally the same or similar. Appliance 108 is further described below corresponding to FIG. 3.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., enterprise server 122) and a backend system 130. In some embodiments data center 120 can include gateway 106, one or more appliances 108', a hardware security device, or a combination of them.

Enterprise server 122 is an entity represented by an IP address and can exist as a single entity or a member of a server farm. Enterprise server 122 can be a physical server or a virtual server. In some embodiments, enterprise server 122 can include a hardware layer, an operating system, and a hypervisor creating or managing one or more virtual machines. Enterprise server 122 provides one or more services to an endpoint. These services include providing one or more applications 128 to one or more endpoints (e.g., client devices 102A-F or branch office 140). For example, applications 128 can include Microsoft Windows™-based applications and computing resources.

Desktop delivery controller 124 is a device that enables delivery of services, such as virtual desktops 126 to client devices (e.g., client devices 102A-F or branch office 140). Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Hardware security device 129, which can be also called hardware security module (HSM), is a physical computing device that safeguards and manages digital keys for strong authentication and provides crypto-processing. Hardware security device 129 comes in the form of a plug-in card or an external device that attaches directly to a computer or network server (e.g., data center 120). In some embodiments, hardware security device 129 can be a standalone device or can be embedded in appliance 108'. Hardware security device 129 can be a dedicated crypto processor or device that is specifically designed for protection of crypto key lifecycle. Hardware security device 129 can act as a trust anchor that protects cryptographic infrastructure by securely managing, processing, and storing cryptographic keys. Hardware security device 129 can store, manage, and maintain any keys or certificate for secure session connections including but not limited to: any security credentials, cryptographic keys, a session tunnel key, a session key between appliance 108/108' and a server (e.g., public server 150 or enterprise server 122), a session key between appliance 108/108' and client device (e.g., 102A-F), a private key, a public key, a proxy certificate, a server certificate, a premaster secret, a master secret, etc. Hardware security device 129 can provision encryption, decryption, authentication and digital signaling services for a wide range of applications.

Backend system 130 is a single or multiple instances of computer networking hardware, appliances, or servers in a server farm or a bank of servers and interfaces directly or indirectly with enterprise server 122. For example, backend system 130 can include Microsoft Active Directory™, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle™ backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network (LAN) that is part of the Wireless LAN (WLAN) having data center 120. Branch office 140 can be part of a WAN connected with network server (e.g., data center 120). Branch office 140 can include, among other things, appliance 108 and remote backend 142. In some embodiments, appliance 108 can sit between branch office 140 and private network 110. As stated above, appliance 108 can work with appliance 108'. Remote backend 142 can be set up in similar manner as backend system 130 of data center 120. Client device 102E can be located on-site to branch office 140 or can be located remotely from branch office 140.

Public server 150 is an entity represented by an IP address. Public server 150 can be a physical server or a virtual server. In some embodiments, public server 150 can include a hardware layer, an operating system, and a security agent issuing security-related parameters such as public keys, cipher certificates, session identifiers and session tickets, and managing one or more secure connections. Public server 150 can be accessed directly or indirectly by client devices 102A-F. Public server 150 provides one or more services to an endpoint. These services include one or more applications, such as web-browser applications, to one or more endpoints (e.g., client devices 102A-F, data center 120, branch office 140, or appliance 108 or 108'). Public server 150 can provide secure connections using Internet security protocols, e.g., SSL/TLS protocols, for secure services to one or more endpoints (e.g., client devices 102A-F, data center 120, branch office 140, or appliance 108 or 108'). The present application describes optimizing secure session connections by proxying secure session connections between a middlebox (e.g., appliance 108) and another middlebox (e.g., appliance 108') or public server 150. However, it is appreciated that the disclosed method can be applicable on any kind between two apparatuses to optimize secure session connections (e.g., SSL/TLS session connections).

In the embodiments disclosed herein, it is assumed that appliance 108' configures a proxy certificate and a private key, and that there exists a secure tunnel between appliances 108 and 108'. Any data and messages are assumed to be encrypted with a shared key (e.g., shared key $K_t$) over the secure tunnel. It also assumes that a server (e.g., public server 150 or enterprise server 122) does not perform client authentication.

Appliances 108 and 108' and gateway 106 can be deployed as or executed on any type and form of specific computing device (e.g., such as the computing device of FIGS. 2A-2B) capable of communicating on any type and form of network described herein. Appliances 108 and 108' can be deployed individually or as a pair operatively connected together.

Figure 2A:
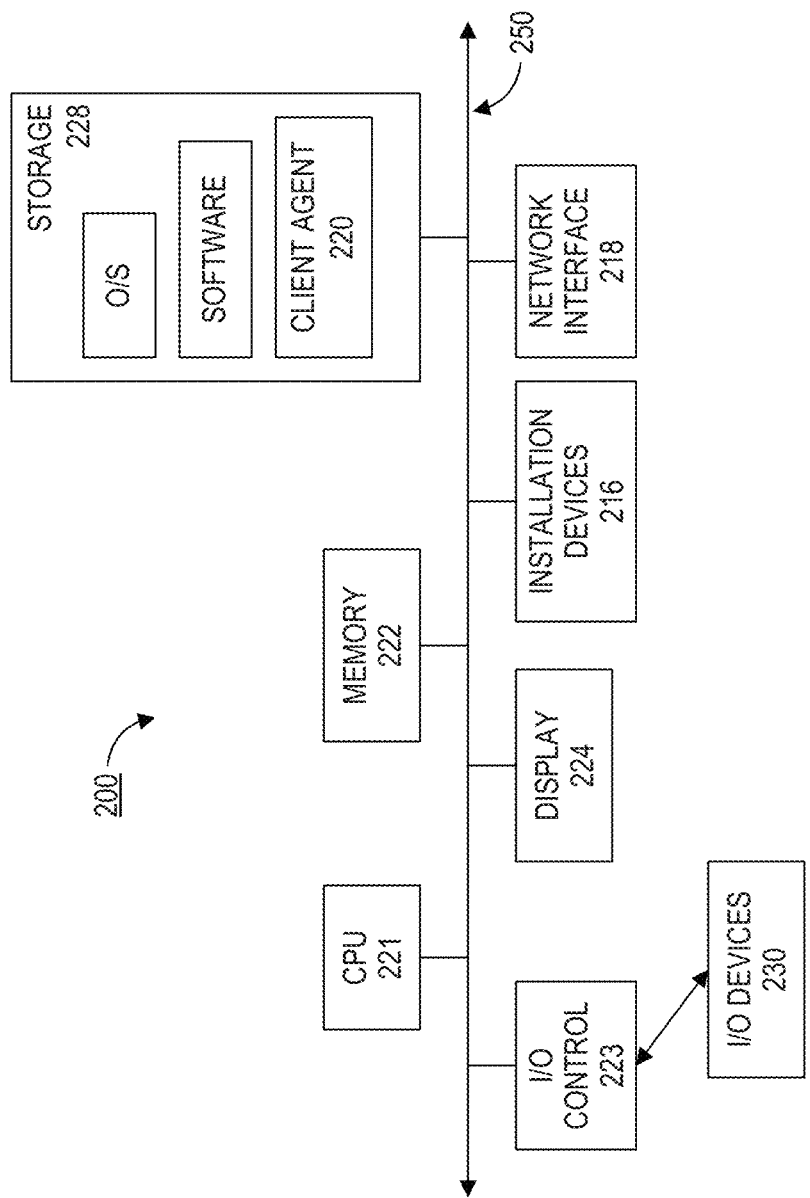
FIGS. 2A-2B are block diagrams of an exemplary computing device, consistent with embodiments of the present disclosure.
Figure 2B:
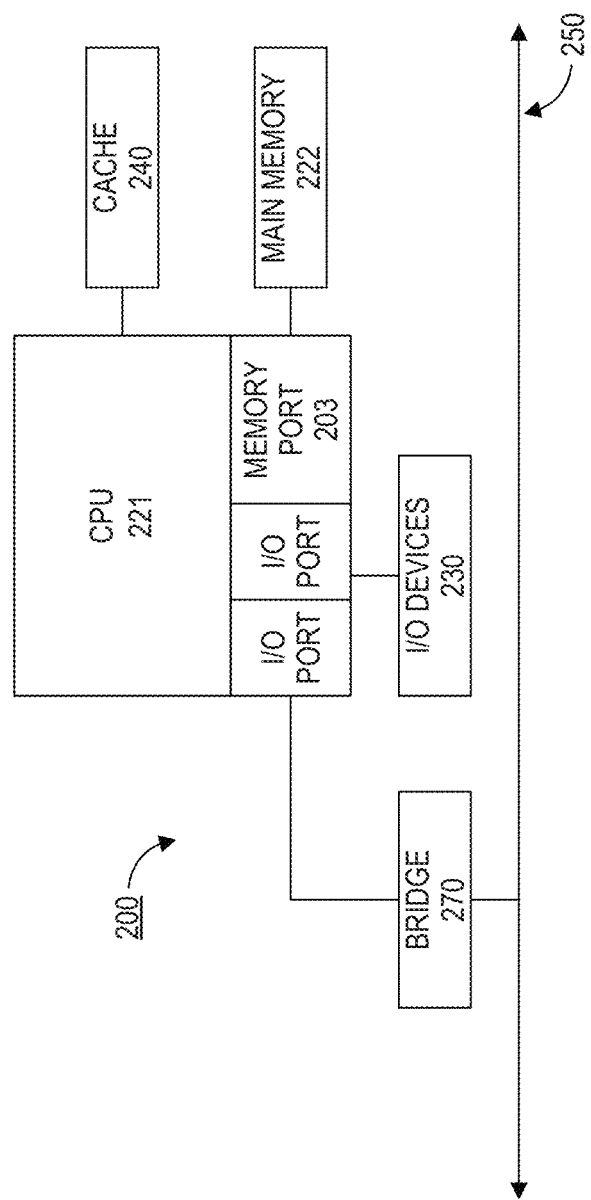

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with main memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a FireWire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of links including, but not limited to, standard telephone lines, LAN or WAN links (e.g., 802.11, T1, T3, 56 kb, X.25), broadband links (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3:
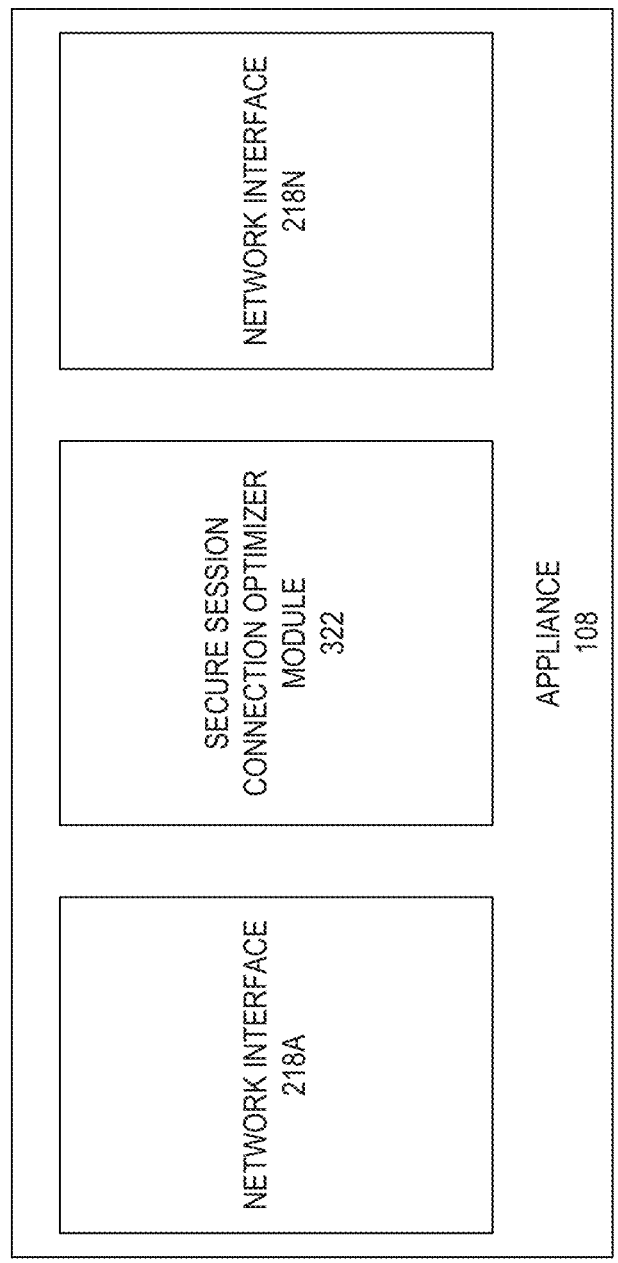
FIG. 3 is a block diagram of an exemplary appliance illustrated in FIG. 1, consistent with embodiments of the present disclosure.

FIG. 3 is a block diagram of an exemplary appliance 108 and/or 108' illustrated in FIG. 1, consistent with embodiments of the present disclosure. Appliance 108 can include a secure session connection optimizer module 322 and one or more network interfaces 218A-N consistent with network interface 218 of FIG. 2A. Although FIG. 3 depicts network interfaces 218A-218N as two network interfaces, it is appreciated that interfaces 218A-218N can include any number of network interfaces.

Secure session connection optimizer module 322 is a module, which is a packaged functional hardware unit designed for use with other components or a part of a program that performs a particular function of related functions. In some aspects, secure session connection optimizer module 322 can operate on two or more devices, e.g., client devices 102A-F, branch office 140, data center 120, and public server 150, functionally connected to provide efficient secure session connections using secure protocol, for example, SSL/TLS protocol. Each device having secure session connection optimizer module 322 can be configured to act as either SSL/TLS client or SSL/TLS server for handshake process.

Figure 4:
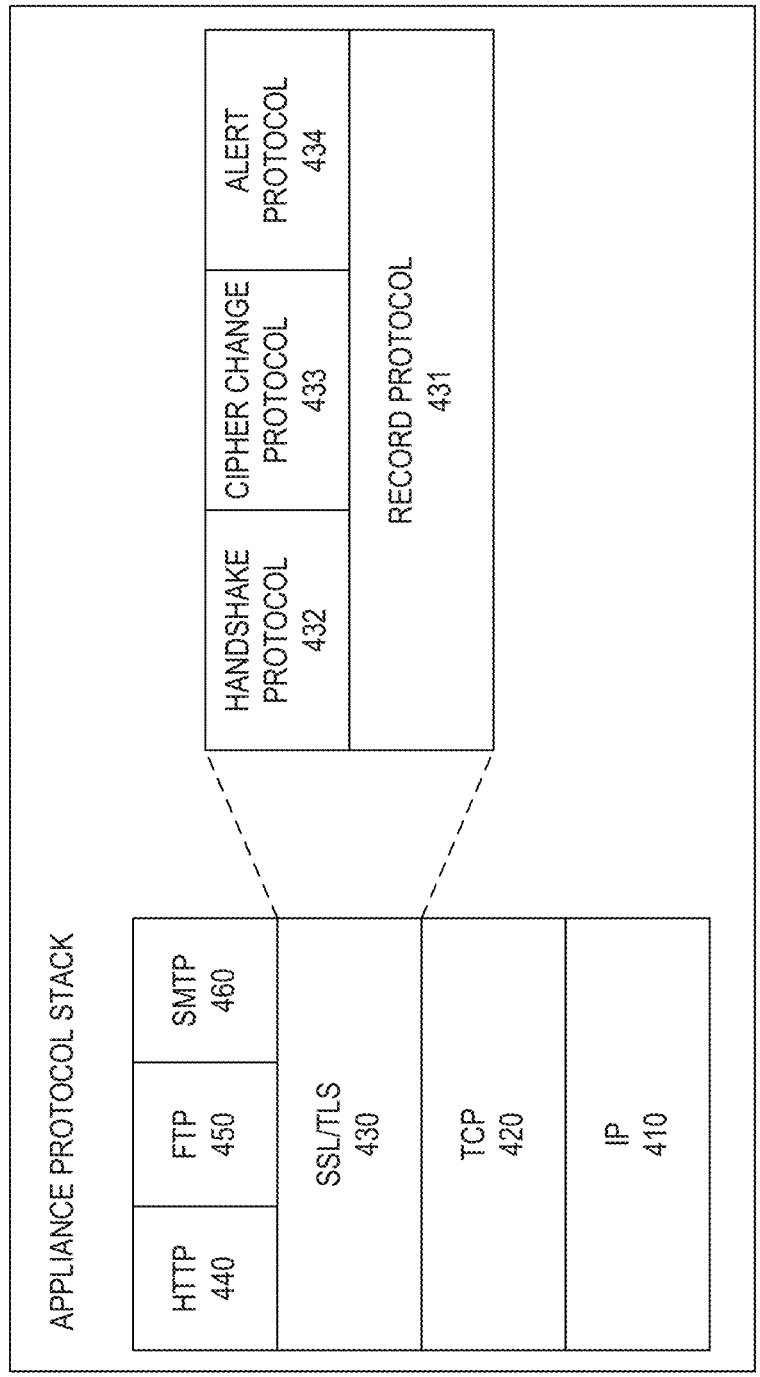
FIG. 4 is a block diagram of an exemplary protocol stack of appliance, consistent with embodiments of the present disclosure.

FIG. 4 is a block diagram of an exemplary protocol stack 400 of appliance 108 and/or 108', consistent with embodiments of the present disclosure. According to some embodiments, appliance 108 and/or 108' can be configured to have a security layer, e.g., SSL/TLS layer 430. The SSL/TLS layer 430 can include secure session connection optimizer module 322 (depicted in FIG. 3) and a secure socket Application Programming Interface (API) (not shown). The security layer, e.g., SSL/TLS layer 430 of FIG. 4, can use underlying layers for reliable communications. Such underlying layers can be provided by, e.g., Transport Control Protocol (TCP) layer 420 and Internet Protocol (IP) layer 410. Applications, such as web service applications, can use the secure socket API to encrypt communication with any remote application that communicates according to SSL/TLS protocol. Any standard Internet web browser on public server 150 can be accessed by secure web server applications using application protocols such as HyperText Transfer Protocol (HTTP) 440, File Transfer Protocol (FTP) 450, Simple Mail Transfer Protocol (SMTP) 460, etc. on top of SSL/TLS 430.

In some embodiments, SSL/TLS layer 430 can include a record protocol layer 431, a handshake protocol layer 432, cipher change protocol layer 433, and alert protocol layer 434, as referenced in Internet Engineering Task Force (IETF) Request For Comments (RFC) 6101. The record protocol layer 431 can receive uninterpreted data from higher layers e.g., application layer. The record protocol layer 431 is responsible for fragmenting uninterpreted data with fixed length and encrypting packets that were broken down with fixed-length compressing the data. The record protocol layer 431 is also responsible for adding SSL header in the packets.

The handshake protocol layer 432 that operates on top of the record protocol layer 431 can produce cryptographic parameters of session state. As an example, a secure session connection optimizer module 322 that operates in appliance 108 can act as an SSL client, and another secure session connection optimizer module 322 that operates in appliance 108' can act as an SSL server. Likewise, a secure session connection optimizer module 322 that operates in client device (e.g., 102E) can act as an SSL client, and another secure session connection optimizer module 322 that operates in appliance 108 can act as an SSL server. A secure session connection optimizer module 322 that operates in appliance 108' can act as an SSL client, and another secure session connection optimizer module 322 that operates in public server 150 can act as an SSL server.

When an SSL client and an SSL server first start communicating, the SSL client and the SSL server agree on a protocol version, select cryptographic algorithms, optionally authenticate each other, and use public key encryption techniques to generate shared secrets. These processes are performed in the handshake protocol, which can be summarized as follows: the SSL client sends client hello message to which the SSL server must respond with server hello message, or else a fatal error will occur and the connection will fail. The SSL client hello and SSL server hello are used to establish security enhancement capabilities between the SSL client and the SSL server. The client hello and server hello establish the following attributes: protocol version, session ID, cipher suite, and compression method. Additionally, two random values are generated and exchanged: ClientHello.random and ServerHello.random.

The cipher change protocol layer 433 is to signal transitions in ciphering strategies between the SSL client and the SSL server. In other words, sending (from the SSL client to the SSL server or vice versa) a message to notify that subsequent records will be protected under just-negotiated CipherSpec and keys.

The alert protocol layer 434 supports alert messages to convey severity of a message and a description of an alert. An alert can include, for example, closure alerts and error alerts. Closure alerts are used to notify that a connection is ending in order to avoid a truncation attack. Error alerts are used to send an error message in the event of error detections. Upon transmission or receipt of a fatal alert message, both the SSL client and the SSL server immediately close a connection.

Figure 5:
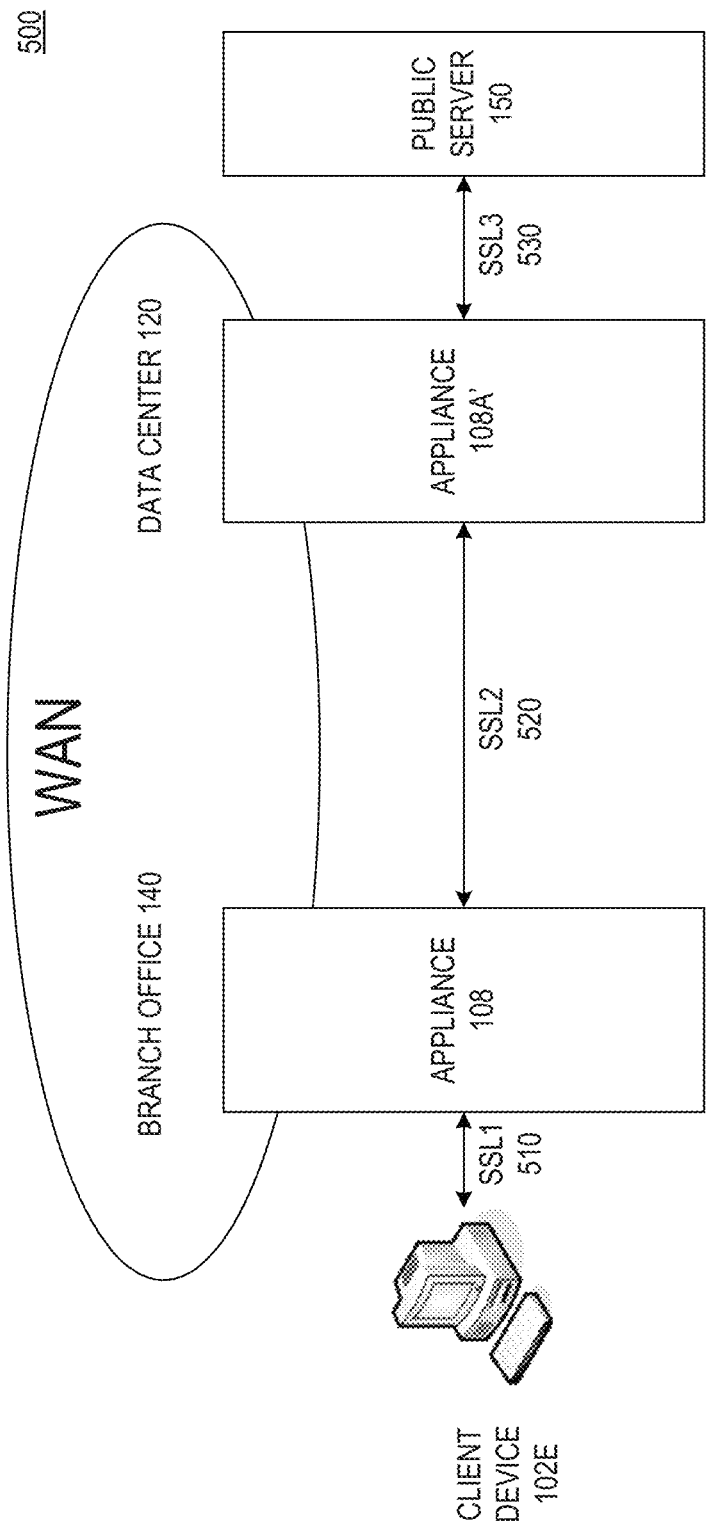
FIG. 5 is a block diagram of an exemplary network environment, consistent with embodiments of the present disclosure.

FIG. 5 is a block diagram of an exemplary network environment 500, consistent with embodiments of the present disclosure. It is appreciated that network environment 500 is a simplified illustration and that other components can be added in network environment 500 whenever necessary. Also, network environment 500 can be any type of network that communicates using packets. The network environment 500 can include a plurality of client devices 102, appliance 108 coupled to branch office 140, appliances 108' that may be located in or out of data center 120, and public server 150. Appliance 108 and 108' can be part of WAN. Although a single appliance 108 is shown in branch office 140 in FIG. 5, it is appreciated that one or more appliances 108 can be located in a plurality of branch offices 140. Likewise, one or more appliances 108' can be located in or out of data center 120 and public server 150.

The network environment 500 can have a plurality of SSL/TLS connections between client device 102 (e.g., client device 102E) and public server 150. As an example, there can be an SSL/TLS connection between client devices 102 (e.g., 102E) and appliance 108, the connection between which refers to SSL1 510. Also, there can be an SSL/TLS connection between appliance 108 in branch office 140 and another appliance 108' (the connection between which refers to SSL2 520) which can be in or out of data center 120. Furthermore, there can be another SSL/TLS connection between appliance 108' and public server 150, the connection between which refers to SSL3 530.

To establish an SSL/TLS connection, an SSL/TLS handshake protocol can be used, for example, IETF RFC 2246 or IETF RFC 6101. The SSL/TLS handshake protocol can include a plurality of handshake messages, for example, client hello (CH), server hello (SH), certificate (C), server hello done (SHD), client key exchange (CKE), change cipher spec (CCS), and finished (F). Assuming that an SSL connection is established between client device 102E and public server 150, an SSL/TLS handshake procedure is initiated by transmitting a client hello message from client device 102E to public server 150. Upon receipt of the client hello (CH) message, public server 150 should respond with a server hello (SH) message. Otherwise, a fatal error will occur and the connection will fail. Client hello (CH) and server hello (SH) messages are used to establish security enhancement capabilities between client device 102E and public server 150. Client hello (CH) and server hello (SH) messages establish attributes, such as protocol version, session ID, cipher suite, and compression method. Following server hello (SH) message, public server 150 sends its certificate, if it is to be authenticated. If public server 150 is authenticated, public server 150 may request a certificate from client device 102E, if that is appropriate to the cipher suite selected. Then, public server 150 sends a server hello done (SHD) message to client device 102E. If public server 150 sent a certificate request message, client device 102E must send either the certificate message or a no_certificate alert. After performing an SSL/TLS handshake procedure between two entities, a shared key is obtained to be used to encrypt and decrypt any data or messages transmitted between the two entities.

Figure 6:
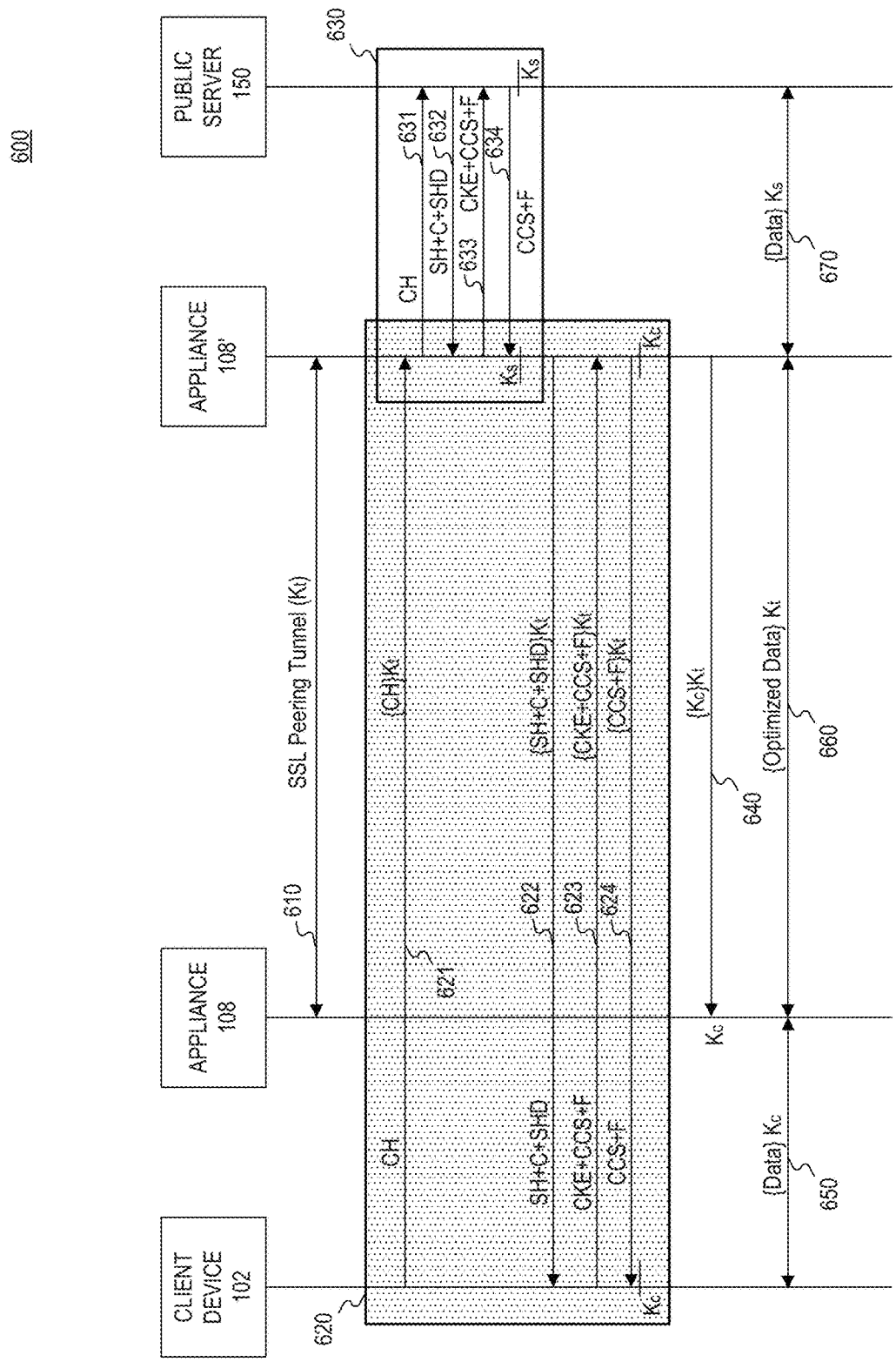
FIG. 6 is a typical signaling transaction of a server side termination.

FIG. 6 is an exemplary signaling transaction of a typical server side termination. As an example, FIG. 6 (shows three segments of secure session connections between client device 102 and appliance 108, between appliance 108 and another appliance 108', and between the other appliance 108' and public server 150, respectively.

As an initial step 610, appliance 108 establishes a secure peering tunnel with appliance 108' using an SSL/TLS handshake protocol and obtains a shared key, $K_t$, to encrypt and decrypt any data or messages transmitted between appliances 108 and 108'. Herein, SSL/TLS handshake protocol can be compliant with standard handshake protocols, such as IETF RFC 6101 and IETF RFC 2246.

At step 620, client device 102 establishes a secure connection with appliance 108', and at step 630 appliance 108' establishes another secure connection with public server 150. Each of steps 620 and 630 can be called a secure session handshake procedure.

Steps 620 and 630 can comprise sub-steps (e.g., steps 621-624, and steps 631-634, respectively). For example, at step 621, client device 102 sends client hello (CH) message to appliance 108' via appliance 108. When receiving client hello (CH) message, appliance 108 can encrypt client hello (CH) message using the shared key, $K_t$, and can send to appliance 108'. Upon receipt of the encrypted client hello (CH) message, appliance 108' can decrypt the encrypted client hello (CH) message and sends the decrypted client hello (CH) message to public server 150 at step 631. At step 632, in response to client hello (CH) message, public server 150 sends server hello (SH), its certificate (C), and server hello done (SHD) messages to appliance 108'. At step 633, appliance 108' sends its client key exchange (CKE), change cipher spec (CCS), and finished (F) messages to public server 150. At step 634, public server 150 replies with its change cipher spec (CCS) and finished (F) messages to appliance 108'. As a result, a shared key, $K_s$, is obtained and shared between appliance 108' and public server 150. Shared key $K_s$, is used to encrypt and decrypt any data or messages transmitted between appliance 108' and public server 150 at step 670.

After a secure connection is established between appliance 108' and public server 150 at step 630, appliance 108' sends, in response to client hello (CH) message at step 621, server hello (SH), its certificate (C), and server hello done (SHD) messages to client device 102 at step 622. Client device 102 sends its client key exchange (CKE), change cipher spec (CCS), and finished (F) messages to appliance 108' at step 623. Appliance 108' replies with its change cipher spec (CCS) and finished (F) messages to client device 102. As a result, a shared key, $K_c$, is obtained and shared between client device 102 and appliance 108'. In addition, appliance 108' transmits the shared key, $K_c$, to appliance 108 at step 640. At step 650, appliance 108 thus can use the shared key, $K_c$, to encrypt and decrypt any data or messages exchanged between appliance 108 and client device 102.

Any data or messages such as client hello (CH), server hello (SH), certificate (C), server hello done (SHD), client key exchange (CKE), change cipher spec (CCS), finished (F), and $K_c$ transmitted between appliances 108 and 108' at steps 621-624, 640, and 660 are encrypted and decrypted using $K_t$. For example, at step 621, when appliance 108 sends client hello (CH) message to appliance 108', appliance 108 encrypts client hello (CH) message using $K_t$ and appliance 108' decrypts, upon receipt of the encrypted client hello (CH) message, the encrypted client hello (CH) message using $K_t$. Similarly, when appliance 108' sends server hello (SH), its certificate (C), and server hello done (SHD) messages to appliance 108 at step 622, appliance 108' encrypts server hello (SH), its certificate (C), and server hello done (SHD) messages using $K_t$ and appliance 108 decrypts, upon receipt, the encrypted server hello (SH), its certificate (C), and server hello done (SHD) messages using $K_t$.

The typical server side termination method exemplified in FIG. 6 causes a 2.5 round trip time (RTT) setup time in a WAN network, for example, comprising a plurality of appliances (e.g., appliances 108 and 108'). The server side termination method provides poor performance for short lived connections based on secure protocols, such as Secure HyperText Transfer Protocol (HTTPS). In addition, the server side termination method does not leverage the co-located appliance 108 in branch office 140, because appliance 108 in branch office 140, without providing special benefits over system performance, at best, decrypt received data or messages from client device 102 and encrypt the decrypted received data or message before transmitting over SSL peering tunnel toward appliance 108'.

Figure 7:
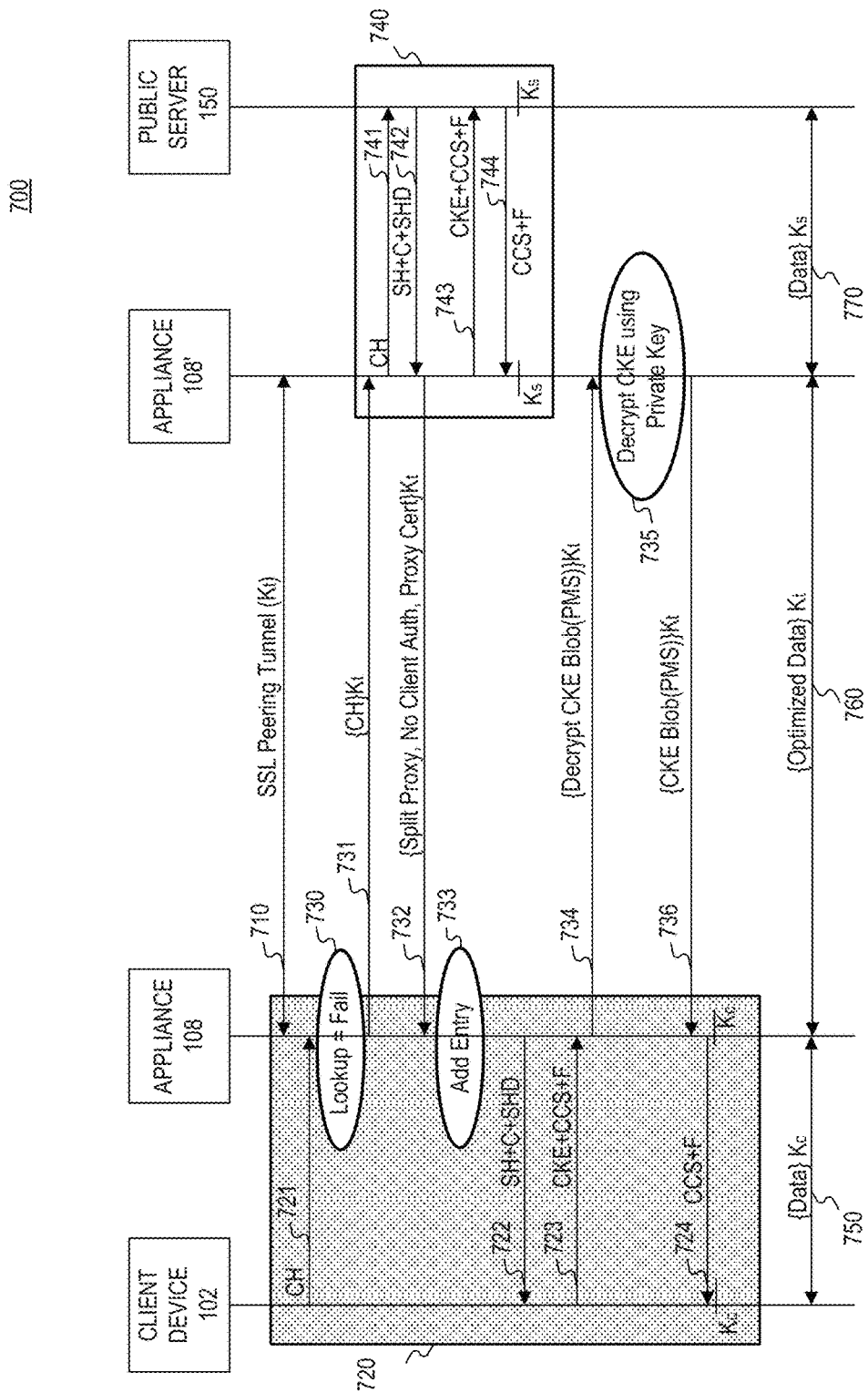
FIG. 7 is an exemplary signaling transaction of an initial secure session handshake procedure, consistent with embodiments of the present disclosure.

FIG. 7 is an exemplary signaling transaction of an initial secure session handshake procedure, consistent with embodiments of the present disclosure. It will be readily appreciated that the illustrated signaling transaction can be altered to delete steps or further include additional steps.

At step 710, appliance 108 establishes a secure peering tunnel with appliance 108' using an SSL/TLS handshake protocol and obtains a shared key, $K_t$, to encrypt and decrypt any data or messages transmitted between appliances 108 and 108'.

At step 720, client device 102 establishes a secure connection with appliance 108. Step 720 can also be called a secure session handshake procedure. Step 720 can also comprise sub-steps, e.g., steps 721-724. For example, at step 721, client device 102 sends a client hello (CH) message to appliance 108.

Upon receipt of client hello (CH) message, appliance 108 checks a lookup table (e.g., lookup table 1300 in FIG. 13) at step 730 using information including a server's IP address and port number from the client hello (CH) message. The lookup table is like a cache that allows appliance 108 to make a quick decision for any potential system optimization. When it lookup table fails to provide an information corresponding to the client hello (CH) message at step 730, appliance 108 encrypts the client hello (CH) message using shared key $K_t$, and sends the encrypted client hello message{CH}$K_t$ to appliance 108' over SSL peering tunnel at step 731.

At step 740, appliance 108' establishes a secure connection with public server 150. Upon receipt of the encrypted client hello (CH) message, appliance 108' decrypts the encrypted client hello (CH) message, and sends the decrypted client hello (CH) message to public server 150 at step 741. At step 742, in response to CH message, public server 150 sends server hello (SH), its certificate (C), and server hello done (SHD) messages to appliance 108'.

Upon receipt of server hello (SH), its certificate (C), and server hello done (SHD) messages from public sever 150, appliance 108' determines that client authentication is not required by public server 150 and that appliance 108 in Branch Office 140 should perform in split proxy mode. Based on the determination, appliance 108' sends appliance 108 at least one of mode information, client authentication requirement, certificate information. When retrieving the mode information from appliance 108', appliance 108 can store the at least one of mode information in an entry of the lookup table mode information including proxy certificate at step 732. Alternatively, based on the determination, appliance 108' sends appliance 108 information including proxy certificate, an indication that no client authentication is required by public server 150, and split proxy mode to be performed by appliance 108 at step 732. Upon receipt of server hello (SH), its certificate (C), and server hello done (SHD) messages from public sever 150, appliance 108' also sends its client key exchange (CKE), change cipher spec (CCS), and finished (F) messages to public server 150 at step 743, and in turns receives change cipher spec (CCS) and finished (F) message from public server 150 at step 744. As a result, a shared key, $K_s$, is obtained and shared between appliance 108' and public server 150.

Upon receipt of the information from appliance 108', appliance 108, at step 733, adds an entry in the lookup table, where each entry is distinguished by IP address and port information of a server (e.g., public server 150), and stores in the entry the received information including proxy certificate, an indication that no client authentication is required by public server 150, and split proxy mode to be performed by appliance 108. This information stored in the lookup table can allow appliance 108 to make a quick decision using split proxy mode and can save one RTT in a network (e.g., WAN) during a secure session connections establishment.

In response to client hello (CH) message at step 721, appliance 108 sends server hello (SH), its certificate (C), and server hello done (SHD) messages to client device 102 at step 722. At step 723, appliance 108 receives client key exchange (CKE), change cipher spec (CCS) and finished (F) messages from client device 102.

Upon receipt of client key exchange (CKE) from client device 102, appliance 108 requests appliance 108' to decrypt the client key exchange (CKE) that contains premaster secret information at step 734. Then, appliance 108' decrypts the client key exchange (CKE) by using a private key corresponding to the proxy certificate at step 735 and sends the decrypted client key exchange (CKE) to appliance 108 at step 736. Thus, appliance 108 obtains premaster secret information from the decrypted client key exchange (CKE). Appliance 108 can also store the premaster secret information in the entry of the lookup table under the same IP address and port information of the server (e.g., public server 150). At step 724, appliance 108 sends change cipher spec (CCS) and finished (F) messages to client device and obtains a shared key, $K_c$. Shared key $K_c$ can be used to encrypt and decrypt any data or messages exchanged between appliance 108 and client device 102 at step 750. Shared key $K_s$ is used to encrypt and decrypt any data or messages transmitted between appliance 108' and public server 150 at step 770.

Any data or messages, for example, client hello (CH), mode information (e.g. split proxy mode or transparent mode), client authentication requirement, proxy certificate, a request to decrypt client key exchange (CKE), and decrypted client key exchange (CKE), transmitted between appliances 108 and 108' at steps 731-734, 736, and 760 are encrypted and decrypted using shared key $K_t$. For example, at step 731, when appliance 108 sends client hello (CH) message to appliance 108', appliance 108 encrypts client hello (CH) message using $K_t$ and appliance 108' decrypts, upon receipt of the encrypted client hello (CH) message, the encrypted client hello (CH) message using $K_t$. Similarly, when appliance 108' sends a decrypted client key exchange (CKE) to appliance 108 at step 736, appliance 108' encrypts the decrypted client key exchange (CKE) using $K_t$ and sends it to appliance 108 over SSL peering tunnel.

The initial secure session handshake procedure with split proxy mode described in FIG. 7 takes 2 RTT in a network, e.g., WAN comprising a plurality of appliances, e.g., appliances 108 and 108'. This initial secure session handshake procedure with split proxy mode in FIG. 7 is better than the server side termination taking 2.5 RTT in FIG. 6.

In some embodiments, hardware security device 129, HSM or cloud HSM can be deployed within the network. If hardware security device 129, HSM or cloud HSM is deployed in a network, appliance 108 can simply redirect to hardware security device 129, HSM or cloud HSM a request to decrypt client key exchange (CKE) at step 734' (not shown in FIGS. 7-8) that replaces step 734. At step 735' (not shown in FIGS. 7-8) that replaces step 735, hardware security device 129, HSM or cloud HSM can decrypt the client key exchange (CKE), for example, using public-key cryptography standards. Appliance 108 can receive decrypted client key exchange (CKE) from hardware security device 129, HSM or cloud HSM at step 736' (not shown in FIGS. 7-8) that replaces step 735.

Figure 8:
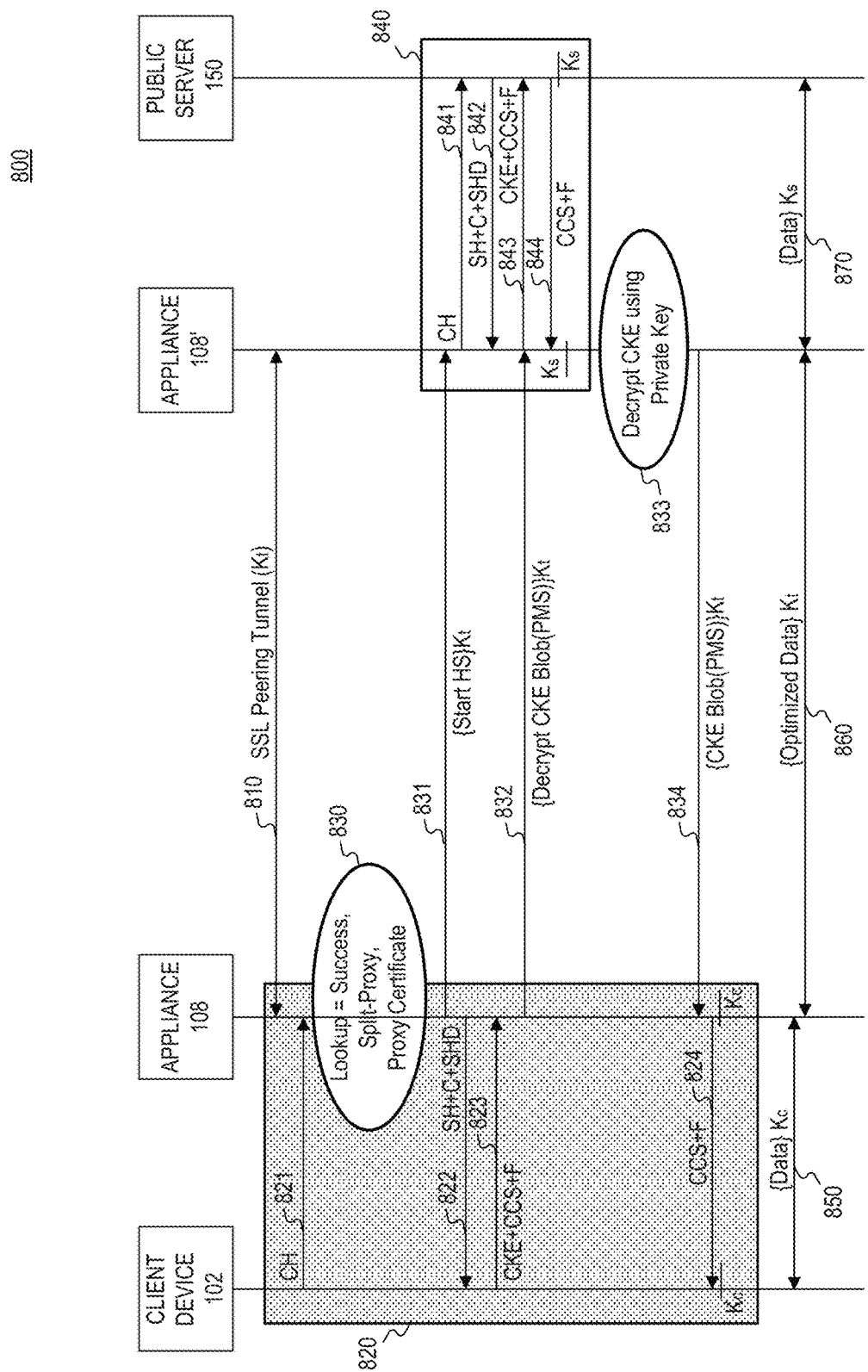
FIG. 8 is an exemplary signaling transaction of a subsequent secure session handshake procedure, consistent with embodiments of the present disclosure.

FIG. 8 is an exemplary signaling transaction of a subsequent secure session handshake procedure, consistent with embodiments of the present disclosure. It will be readily appreciated that the illustrated signaling transaction can be altered to delete steps or further include additional steps.

At step 810, appliance 108 establishes a secure peering tunnel with appliance 108' using an SSL/TLS handshake protocol and obtains a shared key, $K_t$, to encrypt and decrypt any data or messages transmitted between appliances 108 and 108'.

At step 820, client device 102 establishes a secure connection with appliance 108. Step 820 can also be called a secure session handshake procedure. Step 820 can also comprise sub-steps, e.g., steps 821-824. For example, at step 821, client device 102 sends a client hello (CH) message to appliance 108.

Upon receipt of client hello (CH) message, appliance 108 checks a lookup table (e.g., lookup table 1300 in FIG. 13) at step 830 using information including a server's IP address and port number from the client hello (CH) message. The lookup table is like a cache that allows appliance 108 to make a quick decision for any potential system optimization. When it successes to check the lookup table at step 830, appliance 108 finds out proxy certificate information and also finds that appliance 108 should perform in split proxy mode. Based on the successful lookup, appliance 108 generates and encrypts an instruction indicating that appliance 108' should initiate a secure session handshake procedure between appliance 108' and public server 150 at step 831.

In response to client hello (CH) message at step 821, appliance 108 also sends server hello (SH), its certificate (C), and server hello done (SHD) messages to client device 102 at step 822, and receives from client device 102 client key exchange (CKE), change cipher spec (CCS) and finished (F) messages at step 823. Upon receipt of client key exchange (CKE) from client device 102, appliance 108 requests appliance 108' to decrypt the client key exchange (CKE) that contains premaster secret information at step 832. Then, appliance 108' decrypts the client key exchange (CKE) by using a private key corresponding to the proxy certificate at step 833 and sends the decrypted client key exchange (CKE) to appliance 108 at step 834. Thus, appliance 108 obtains premaster secret information from the decrypted client key exchange (CKE). Appliance 108 can also store the premaster secret information in the entry of the lookup table under the same IP address and port information of the server (e.g., public server 150). At step 824, appliance 108 sends change cipher spec (CCS) and finished (F) messages to client device and obtains a shared key, $K_c$. Shared key $K_c$ can be used to encrypt and decrypt any data or messages exchanged between appliance 108 and client device 102 at step 850.

At step 840, appliance 108' establishes a secure connection with public server 150. Upon receipt of the instruction indicating that appliance 108' should initiate a secure session handshake procedure between appliance 108' and public server 150 at step 831, appliance 108' decrypts the instruction using $K_t$, and sends client hello (CH) message to public server 150 at step 841. At step 842, in response to client hello (CH) message, public server 150 sends server hello (SH), its certificate (C), and server hello done (SHD) messages to appliance 108'.

Upon receipt of server hello (SH), its certificate (C), and server hello done (SHD) messages from public sever 150, appliance 108' also sends its client key exchange (CKE), change cipher spec (CCS), and finished (F) messages to public server 150 at step 843, and in turns receives change cipher spec (CCS) and finished (F) message from public server 150 at step 844. As a result, a shared key, $K_s$, is obtained and shared between appliance 108' and public server 150. The shared key, $K_s$, is used to encrypt and decrypt any data or messages transmitted between appliance 108' and public server 150 at step 870.

Any data or messages, for example, an instruction indicating that appliance 108' should initiate a secure session handshake procedure, a request to decrypt client key exchange (CKE), and decrypted client key exchange (CKE), transmitted between appliances 108 and 108' at steps 831, 832, 834, and 860 are encrypted and decrypted using $K_t$. For example, when appliance 108' sends a decrypted client key exchange (CKE) to appliance 108 at step 834, appliance 108' encrypts the decrypted client key exchange (CKE) using $K_t$ and sends it to appliance 108 over SSL peering tunnel.

The secure session handshake procedure with split proxy mode described in FIG. 8 takes one RTT in a network, e.g., WAN comprising a plurality of appliances, e.g., appliances 108 and 108'. This secure session handshake procedure with split proxy mode in FIG. 8 provides a better system optimization when compared to the server side termination taking 2.5 RTT in FIG. 6.

If HSM or cloud HSM is deployed in a network, appliance 108 can simply redirect to HSM a request to decrypt client key exchange (CKE) at step 832' (not shown in FIG. 8) that replaces step 734. At step 833' (not shown in FIG. 8) that replaces step 735, HSM can decrypt the client key exchange (CKE), for example, using public-key cryptography standards. Appliance 108 can receive decrypted client key exchange (CKE) from HSM or cloud HSM at step 834' (not shown in FIG. 8) that replaces step 735.

Figure 9:
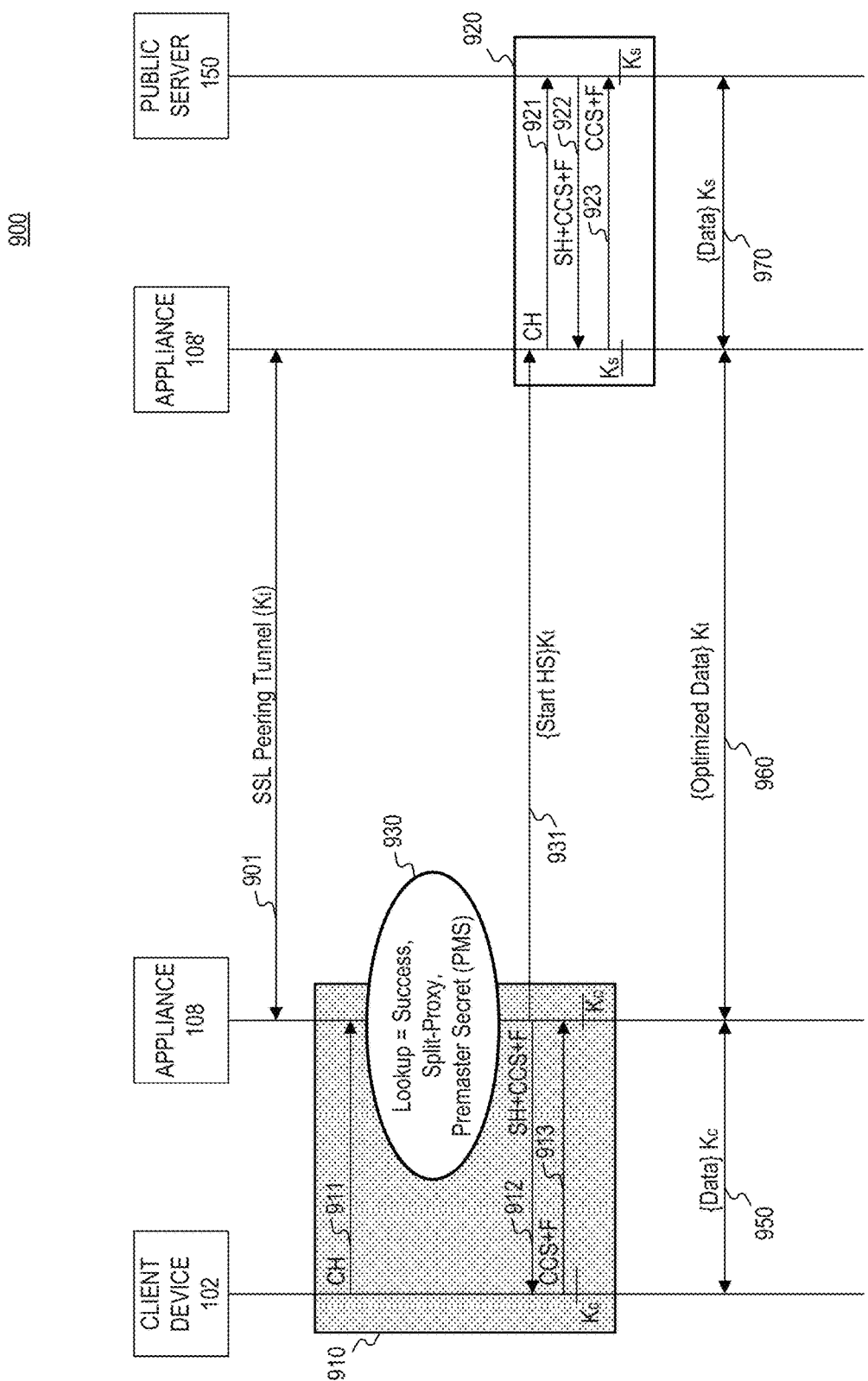
FIG. 9 is an exemplary signaling transaction of a reusing handshake procedure, consistent with embodiments of the present disclosure.

FIG. 9 is an exemplary signaling transaction of a reusing handshake procedure, consistent with embodiments of the present disclosure. It will be readily appreciated that the illustrated signaling transaction can be altered to delete steps or further include additional steps.

At step 901, appliance 108 establishes a secure peering tunnel with appliance 108' using an SSL/TLS handshake protocol and obtains a shared key, $K_t$, to encrypt and decrypt any data or messages transmitted between appliances 108 and 108'.

At step 910, client device 102 establishes a secure connection with appliance 108, and at step 920 appliance 108' establishes another secure connection with public server 150. Steps 910 and 920 can be another secure session handshake procedure in the patent application, although message transactions in steps 910 and 920 are different from those in steps 620, 630, 720, 740, 820, and 840. Steps 910 and 920 can comprise sub-steps (e.g., steps 911-913, and steps 921-923). For example, at step 911, client device 102 sends client hello (CH) message to appliance 108.

Upon receipt of client hello (CH) message at step 911, appliance 108 checks a lookup table (e.g., lookup table 1300 in FIG. 13) at step 930 using information including a server's IP address and port number from the client hello (CH) message. Lookup table is like a cache that allows appliance 108 to make a quick decision for any potential system optimization. When it successes to check the lookup table at step 930, appliance 108 finds out premaster secret information and also finds that appliance 108 should perform in split proxy mode. Based on the successful lookup, appliance 108 generates and encrypts an instruction indicating that appliance 108' should initiate a secure session handshake procedure between appliance 108' and public server 150 at step 931.

In response to client hello (CH) message at step 911, appliance 108 does not need to send client key exchange (CKE) and its certificate (C) to client device 102, because premaster secret information has been already obtained and stored in lookup table, and thus sends server hello (SH), change cipher spec (CCS) and finished (F) messages to client device 102 at step 912. Then, appliance 108 receives from client device 102 change cipher spec (CCS) and finished (F) messages at step 913 and obtains a shared key, $K_c$. The shared key, $K_c$ can be used to encrypt and decrypt any data or messages exchanged between appliance 108 and client device 102 at step 650. These steps 911-913 allow omitting the steps 734-736 shown in FIG. 7 and the steps 832-834 shown in FIG. 8 and thus resulting in establishing secure connection faster.

At step 920, appliance 108' establishes a secure connection with public server 150. Upon receipt of the instruction indicating that appliance 108' should initiate a secure session handshake procedure between appliance 108' and public server 150 at step 931, appliance 108' decrypts the instruction using $K_t$, and sends client hello (CH) message to public server 150 at step 921. In response to client hello (CH) message, public server 150 sends server hello (SH), change cipher spec (CCS) and finished (F) messages to appliance 108' at step 922. At step 923, public server 150, in turn, receives from appliance 108' change cipher spec (CCS) and finished (F) messages, and obtains a shared key, $K_s$. The shared key, $K_s$ can be used to encrypt and decrypt any data or messages exchanged between appliance 108' and public server 150 at step 870. These steps 921-923 allow omitting the steps 734-736 shown in FIG. 7 and the steps 832-834 shown in FIG. 8 and thus resulting in establishing secure connection faster.

Any data or messages, for example, an instruction indicating that appliance 108' should initiate a secure session handshake procedure transmitted between appliances 108 and 108' at steps 931, and 860 are encrypted and decrypted using shared key $K_t$. For example, when appliance 108 sends an instruction indicating that appliance 108' should initiate a secure session handshake procedure to appliance 108' at step 931, appliance 108 encrypts the instruction using $K_t$ and sends the encrypted instruction to appliance 108' over SSL peering tunnel.

The reusing handshake procedure described in FIG. 9 takes 0.5 RTT in a network, e.g., WAN comprising a plurality of appliances, e.g., appliances 108 and 108'. This reusing handshake procedure with split proxy mode in FIG. 9 take 0.5 RTT and provides the best system optimization with respect to RTT compared with that of procedures disclosed in FIGS. 6-8. The reusing handshake procedure is prominent for short lived connections such as HTTPS. The reusing handshake procedure is not less secure than server side termination at all. The reusing handshake procedure can provides full control ciphers, version, and so on.

Figure 10:
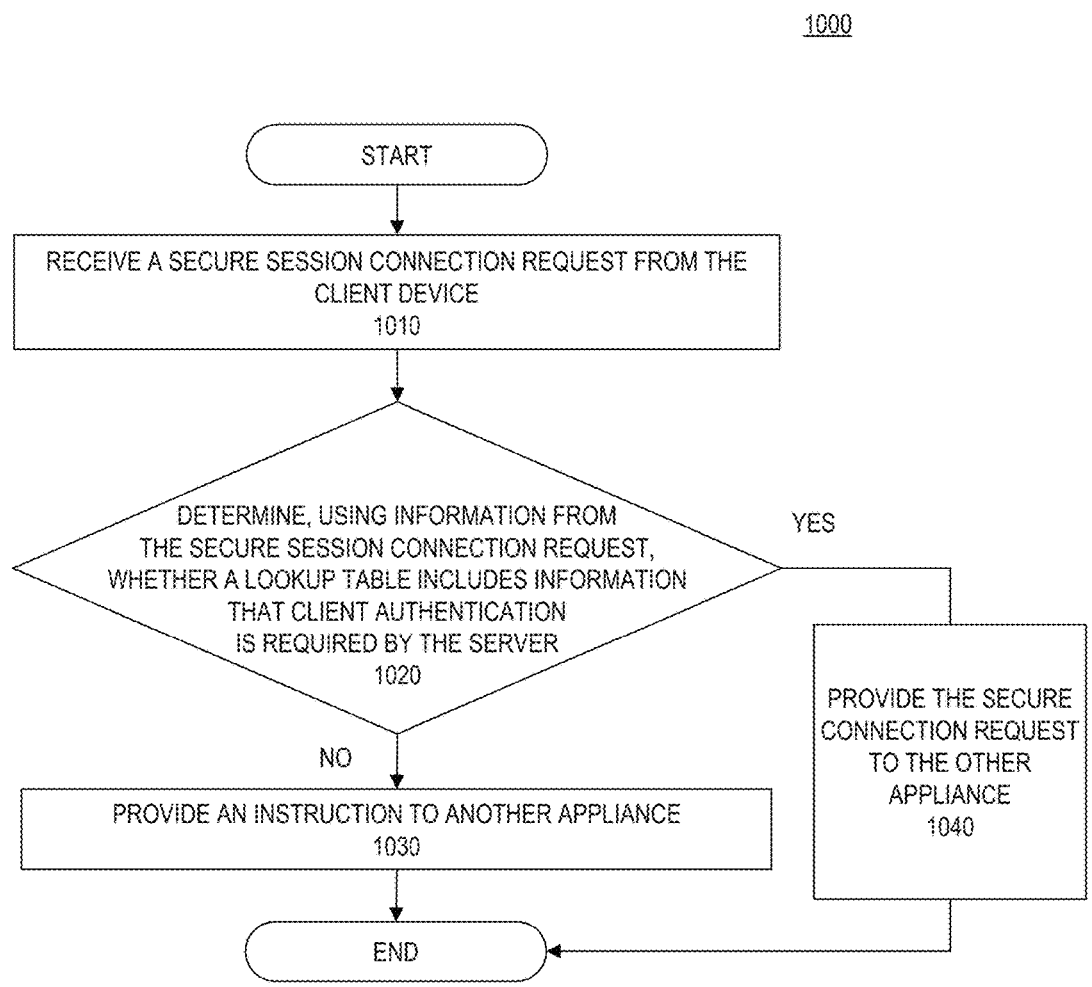
FIG. 10 is a flowchart representing an exemplary method of making efficient secure connections, consistent with embodiments of the present disclosure.

FIG. 10 is a flowchart representing an exemplary method 1000 of making efficient secure connections, consistent with embodiments of the present disclosure. It will be readily appreciated that the illustrated method 1000 can be altered to delete steps or further include additional steps. While method 1000 is described as being performed by an appliance (e.g., appliance 108), it is appreciated that method 1000 can be performed by other devices alone or in combination with the appliance.

Appliance 108 can comprise one or more network interfaces configured to facilitate secure communications between client device 102 and a server (e.g., public server 150 or enterprise server 122), wherein the secure communications involve a plurality of secure session connections comprising a first secure session connection between client device 102 and the appliance 108 and a second secure session connection between the appliance 108 and another appliance 108'. Appliance 108 can further comprise a secure session connection optimizer module that can be configured to perform all or part of the steps exampled in FIG. 10. Appliance 108 can receive a secure session connection request from client device 102 at step 1010. The secure session connection request can be a client hello message based on an SSL/TLS handshake protocol. The secure session connection request can include at least one of protocol version, session ID, cipher suite, compression method, client device ID, etc.

Appliance 108 can determine, using information from the secure session connection request, whether a lookup table (e.g., lookup table 1300 in FIG. 13) includes information that client authentication is required by the server at step 1020. Appliance 108 can use the information from the secure session connection request, for example, client device ID, a server's IP address and port number in order to check the lookup table. The lookup table can be stored in appliance 108 or out of appliance 108. If the lookup table is externally located, appliance 108 can gain access to the lookup table in order to check information stored in the lookup table. The lookup table can include one or more entries. Each entry can be distinguished based on an IP address and a port number of the server. Each entry in the lookup table can include but is not limited to at least one of mode information, client authentication requirement, proxy certificate, and premaster secret information. Mode information can indicate in which mode appliance 108 should perform for secure session connection. Mode information can comprise split proxy mode and transparent mode. Mode information is related to client authentication requirement. In other words, mode information itself can indicate whether client authentication by the server is required or not. Reversely, information whether client authentication by the server is required can also indicate mode information. For example, appliance 108 can act as a split proxy mode when client authentication is not required by the server. Likewise, appliance 108 can act as a transparent mode when client authentication is required by the server.

If the lookup table contains proxy certificate information, proxy certificate information can be reused during subsequent full handshake procedure. Reusing proxy certificate information benefits decreasing one or more signalling transactions between appliance 108 and client device 102 while establishing a secure session connection between them. In addition, if the lookup table contains premaster secret information, premaster secret information can also be reused during a handshake procedure. Reusing premaster secret information significantly reduces a number of signalling transactions between appliance 108 and client device 102, and between appliance 108 and the other appliance 108'.

If the information indicates that client authentication is not required by the server, appliance 108 can provide an instruction to the other appliance 108' at step 1030. When client authentication is not required by the server or in split proxy mode, appliance 108 can play an active role to optimize signalling transactions with another appliance (e.g., appliance 108'), for example, by providing an instruction to the other appliance 108' to initiate a secure session handshake procedure between the other appliance 108' and the server.

If the information indicates that client authentication is required by the server, appliance 108 can provide the secure connection request to the other appliance over the second secure connection at step 1040. When client authentication is required by the server or in transparent mode, appliance 108 can play a passive role, for example, by receiving or sending any data or messages transmitted between client device 102 and the other appliance 108'. Appliance 108 can also perform encrypting or decrypting any data or messages transmitted between client device 102 and the other appliance 108'. For example, appliance 108 can perform the decrypting of any data or messages received from client device 102 using a shared key with client device 102 (e.g, shared key $K_c$), encrypting the decrypted data or messages using another shared key with the other appliance 108' (e.g, shared key $K_t$), and sending the encrypted data or messages to the other appliance 108'. Appliance 108 can also perform decrypting any data or messages received from the other appliance 108' using a shared key with the other appliance 108' (e.g, shared key $K_t$), encrypting the decrypted data or messages using another shared key with client device (e.g, shared key $K_c$), and sending the encrypted data or messages to client device 102.

Figure 11:
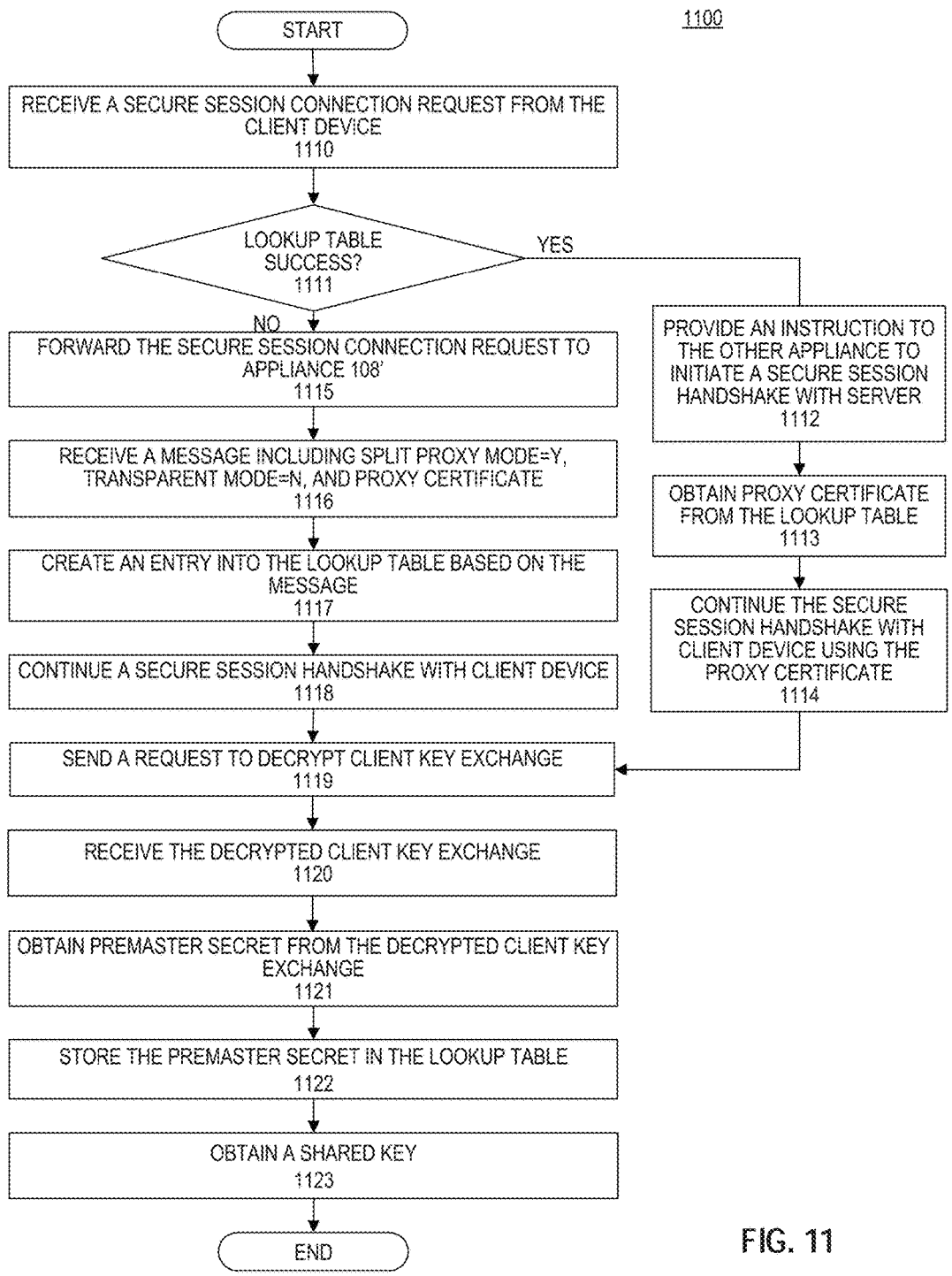
FIG. 11 is another flowchart representing an exemplary method of making efficient secure connections, consistent with embodiments of the present disclosure.

FIG. 11 is a flowchart representing an exemplary method 1100 of making efficient secure connections, consistent with embodiments of the present disclosure. It will be readily appreciated that the illustrated method 1100 can be altered to delete steps or further include additional steps. While method 1100 is described as being performed by an appliance (e.g., appliance 108), it is appreciated that method 1100 can be performed by other devices alone or in combination with the appliance.

Appliance 108 can comprise one or more network interfaces configured to facilitate secure communications between client device 102 and a server (e.g., public server 150 or enterprise server 122), wherein the secure communications involve a plurality of secure session connections comprising a first secure session connection between client device 102 and the appliance 108 and a second secure session connection between the appliance 108 and another appliance 108'. Appliance 108 can further comprise a secure session connection optimizer module that can be configured to perform all or part of the steps exampled in FIG. 11. Appliance 108 can receive a secure session connection request from client device 102 at step 1110. The secure session connection request can be CH message based on an SSL/TLS handshake protocol. The secure session connection request can include at least one of protocol version, session ID, cipher suite, compression method, client device ID, etc. Additionally, two random values are generated and exchanged: ClientHello.random and ServerHello.random.

At step 1111, appliance 108 can check a lookup table (e.g., lookup table 1300 in FIG. 13) and determine, using information including a server's IP address and port number from the secure session connection request, whether the lookup table includes information required to establish secure session connections (e.g., the first and third secure session connections). Appliance 108 can use information from the secure session connection request, for example, client device ID, in order to check the lookup table. The lookup table can be stored in appliance 108 or out of appliance 108. If the lookup table is externally located, appliance 108 can gain access to the lookup table in order to check information stored in the lookup table. The lookup table can include one or more entries. Each entry can be distinguished based on an IP address and a port number of the server. Each entry in the lookup table can include but is not limited to at least one of mode information, client authentication requirement, proxy certificate, and premaster secret information. Mode information can indicate in which mode appliance 108 should perform for secure session connection. Mode information can comprise split proxy mode and transparent mode. Mode information is related to client authentication requirement.

In other words, mode information itself can indicate whether client authentication by the server is required or not. Reversely, information whether client authentication by the server is required can also indicate mode information. For example, appliance 108 can act as a split proxy mode when client authentication is not required by the server. Likewise, appliance 108 can act as a transparent mode when client authentication is required by the server.

If appliance 108 successfully determines that the lookup table includes split mode and proxy certificate information, appliance 108 can provide an instruction to the other appliance 108' to initiate a secure session handshake with the server at step 1112. The instruction can be a command. The command can be in a very short size, and hardly affect a round trip time within a network between appliance 108 and the other appliance 108'. Upon receipt of the instruction, the other appliance 108' initiates a secure session handshake procedure by sending CH message to the server and establishes a secure session connection with the server, represented in 630 in FIGS. 6-8.

Appliance 108 can obtain proxy certificate information from the lookup table at step 1113. Proxy certificate information can be reused during subsequent full handshake procedure, because signalling transactions to request and retrieve proxy certification information are omitted. Thus, reusing proxy certificate information benefits decreasing one or more signalling transactions between appliance 108 and client device 102. At step 1114, appliance 108 can continue the secure session handshake with client device 102 using proxy certificate information to establish a secure session connection between appliance 108 and client device 102.

If appliance 108 fails to check the lookup table or to determine that the lookup table includes split mode and proxy certificate information, appliance 108 can forward the secure session connection request to the other appliance 108' at step 1115. In some embodiment, appliance 108 can encrypt the secure session connection request using a shared key (e.g., shared key $K_t$) and send the encrypted secure session connection request to the other appliance 108' over SSL peering tunnel. Upon receipt of the encrypted secure session connection request, the other appliance 108' can decrypt the encrypted secure session connection request using the shared key (e.g., shared key $K_t$).

At step 1116, appliance 108 can receive a message from the other appliance 108' including mode information and proxy certificate information. For example, the message can include that appliance 108 should act as a split proxy mode (split proxy mode=Y, transparent mode=N) and proxy certificate information. In some embodiments, the message can be triggered by the secure session connection request forwarded at step 1115. In other words, the secure session connection request causes the other appliance 108' to determine whether client authentication is required by the server. If determining that client authentication is not required by the server, the other appliance 108' can generate and send the message including mode information and proxy certificate information to appliance 108.

At step 1117, appliance 108 can check if there is an entry based on an IP address and a port number of the server in the lookup table. If not existing, appliance 108 can create an entry into the lookup table and the entry is distinguished based on an IP address and a port number of the server and store the received information (e.g., mode information, proxy certificate information, etc.) in the entry. In some embodiments, if not existing an entry, appliance 108 can also allocate the entry to store the received information (e.g., mode information, proxy certificate information, etc.) and maintain the entry.

At step 1118, appliance 108 can continue a secure session handshake with client device 102. For example, appliance 108 can send, in response to the secure session connection request (e.g., client hello (CH) message) at step 1110, server hello (SH), proxy certificate, and server hello done (SHD) messages to client device 102. In turn, appliance 108 can also receive client key exchange (CKE), change cipher spec (CCS) and finished (F) messages from client device 102.

Upon receipt of client key exchange (CKE) which has been encrypted by client device 102, appliance 108 can send a request to decrypt the encrypted client key exchange (CKE) to the other appliance 108' at step 1119. Because the other appliance 108' has a private key, the other appliance 108' can decrypt the encrypted client key exchange (CKE) using the private key.

Appliance 108 can receive the decrypted client key exchange (CKE) at step 1120, and can obtain premaster secret information at step 1121 because the client key exchange (CKE) has premaster secret information. Premaster secret is a random value and can be generated by client device 102.

At step 1122, appliance 108 can store the premaster secret information for future reuse in the entry of the lookup table. The entry is identified by an IP address and a port number of the server.

At step 1123, appliance 108 can obtain a shared key using the premaster secret information. For example, appliance 108 and client device 102 can calculate the shared key that can be a master key derived from the premaster secret information based on: master_secret=PRF(pre_master_secret, "master secret", ClientHello.random+ServerHello.random) [0.47]. This shared key can be used to encrypt and decrypt any data and messages transmitted between appliance 108 and client device 102.

PRF stands for a pseudo-random function and is created by applying a data expansion function, P_hash(secret, data), to a secret as followings:

PRF(secret,label,seed)=P_<hash>(secret,label+seed).

P_hash(secret, data) uses a single hash function to expand a secret and seed into an arbitrary quantity of output:

P_hash(secret,seed)=HMAC_hash(secret,A(1)+seed)+
HMAC_hash(secret,A(2)+seed)+HMAC_hash
(secret,A(3)+seed)+. . .

where + indicates concatenation.
A( ) is defined as:
A(0)=seed
A(i)=HMAC_hash(secret, A(i−1))
P_hash can be iterated as many times as necessary to produce the required quantity of data. For example, if P_SHA256 is being used to create 80 bytes of data, it can be iterated three times (through A(3)), creating 96 bytes of output data; the last 16 bytes of the final iteration can then be discarded, leaving 80 bytes of output data.

Figure 12:
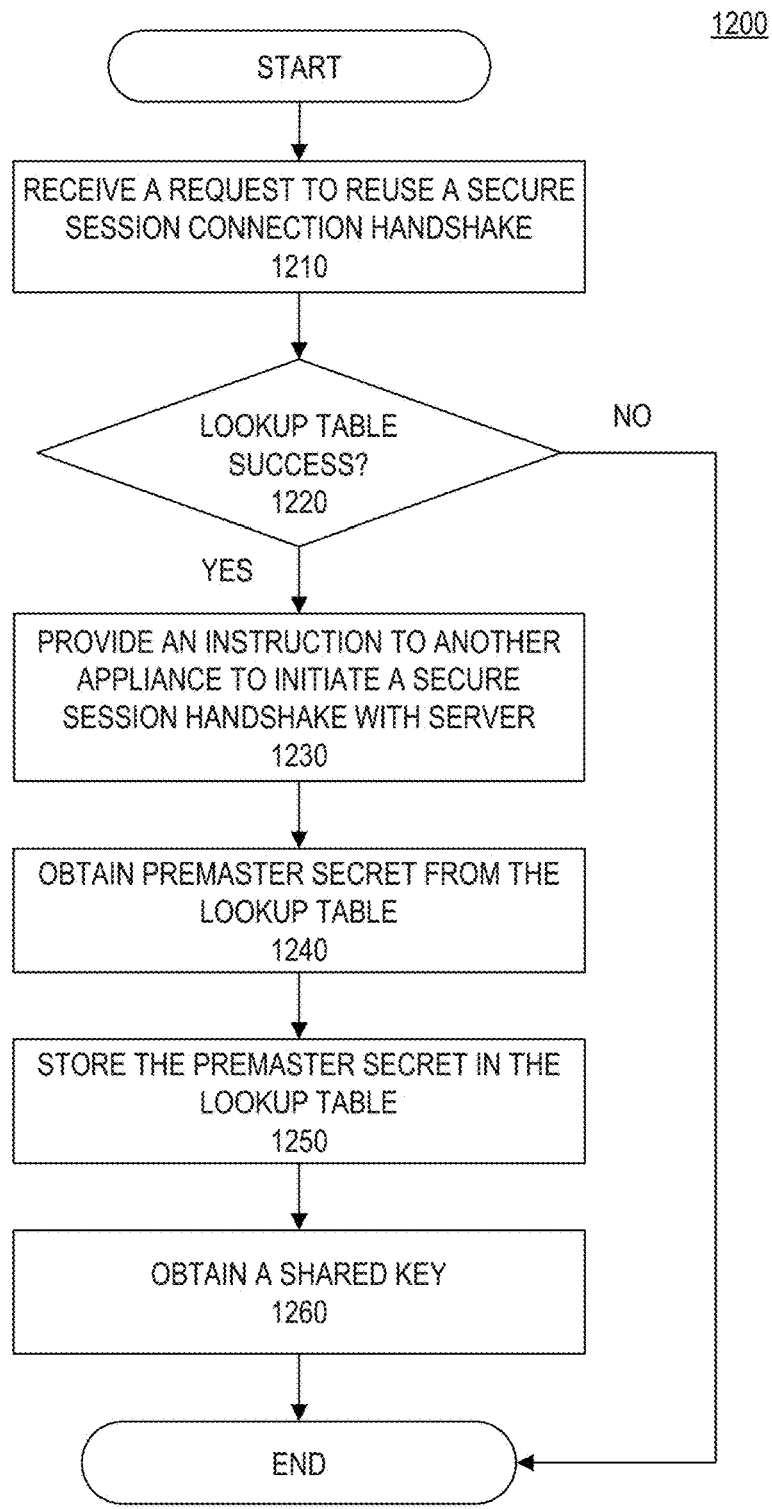
FIG. 12 is another flowchart representing an exemplary method of making efficient secure connections, consistent with embodiments of the present disclosure.

Following the step 1114, appliance 108 performs the steps 1119-1123 in a similar manner FIG. 12 is another flowchart representing an exemplary method 1200 of making efficient secure connections, consistent with embodiments of the present disclosure. Especially, FIG. 12 shows an exemplary method reusing premaster secret information stored in a lookup table (e.g., lookup table 1300 in FIG. 13). It will be readily appreciated that the illustrated method 1200 can be altered to delete steps or further include additional steps. While method 1200 is described as being performed by an appliance (e.g., appliance 108), it is appreciated that method 1200 can be performed by other devices alone or in combination with the appliance.

Appliance 108 can comprise one or more network interfaces configured to facilitate secure communications between client device 102 and a server (e.g., public server 150 or enterprise server 122), wherein the secure communications involve a plurality of secure session connections comprising a first secure session connection between client device 102 and appliance 108 and a second secure session connection between appliance 108 and another appliance 108'. Appliance 108 can further comprise a secure session connection optimizer module that can be configured to perform all or part of the steps exampled in FIG. 12.

At initial step 1210, appliance 108 can receive a request to reuse a secure session connection handshake. That is, appliance 108 has already performed initial secure session connection handshake procedure and has stored information in the lookup table.

At step 1220, appliance 108 can check the lookup table and determine whether the lookup table includes information required to establish subsequent secure session connections. Appliance 108 can use information from the request to reuse a secure session connection handshake, for example, client device ID, a server's IP address and port number in order to check lookup table. The lookup table can be stored in appliance 108 or out of appliance 108. If the lookup table is externally located, appliance 108 can gain access to the lookup table in order to check information stored in lookup table. The lookup table can include one or more entries. Each entry can be distinguished based on an IP address and a port number of a server. Each entry in the lookup table can include but is not limited to at least one of mode information, client authentication requirement, proxy certificate, and premaster secret information. Mode information can indicate in which mode appliance 108 should perform for secure session connection. Mode information can comprise split proxy mode and transparent mode. Mode information is related to client authentication requirement. In other words, mode information itself can indicate whether client authentication by the server is required or not. Reversely, information whether client authentication by the server is required can also indicate mode information. For example, appliance 108 can act as a split proxy mode when client authentication is not required by the server. Likewise, appliance 108 can act as a transparent mode when client authentication is required by the server. If the lookup table contains proxy certificate information, proxy certificate information can be reused during subsequent full handshake procedure. Reusing proxy certificate information benefits decreasing one or more signalling transactions between appliance 108 and client device 102 while establishing a secure session connection between them. In addition, if the lookup table contains premaster secret information, premaster secret information can also be reused during a handshake procedure. Reusing premaster secret information significantly reduces a number of signalling transactions between appliance 108 and client device 102, and between appliance 108 and the other appliance 108'.

When appliance 108 successfully determines that the lookup table includes split mode and premaster secret information, appliance 108 can provide an instruction to the other appliance 108' to initiate a secure session handshake with the server at step 1230. The instruction can be a command. The command can be in a very short size, and hardly affect a round trip time within a network between appliance 108 and the other appliance 108'. Upon receipt of the instruction, the other appliance 108' initiates a secure session handshake procedure by sending client hello (CH) message to the server and establishes a secure session connection with the server, represented in 630 in FIGS. 6-8.

At step 1240, appliance 108 can obtain premaster secret information from the lookup table based on the determination. At step 1250, appliance 108 can store the premaster secret information for future reuse in the entry of the lookup table. The entry is identified by an IP address and a port number of the server.

At step 1260, appliance 108 can obtain a shared key using the premaster secret information. For example, appliance 108 and client device 102 can calculate the shared key that can be a master key derived from the premaster secret information based on: master_secret=PRF(pre_master_secret, "master secret", ClientHello.random+ServerHello.random) [0..47]. This shared key can be used to encrypt and decrypt any data and messages transmitted between appliance 108 and client device 102.

FIG. 13 refers to exemplary entry information that may be included in lookup table, consistent with embodiments of the present disclosure. Lookup table 1300 can include one or more entries. Each entry 1310 can be distinguished based on an IP address and a port number of a server (e.g., public server 150 or enterprise server 122). Each entry in the lookup table 1300 can include but is not limited to at least one of mode information (e.g., 1320, 1330), client authentication requirement 1340, proxy certificate 1350, and premaster secret information 1360. Mode information (e.g., 1320, 1330) can indicate in which mode appliance 108 should perform for secure session connection. Mode information (e.g., 1320, 1330) can comprise split proxy mode 1320 and transparent mode 1330. Mode information (e.g., 1320, 1330) is related to client authentication requirement 1340. In other words, mode information (e.g., 1320, 1330) itself can indicate whether client authentication by the server is required or not. Reversely, information whether client authentication by the server is required can also indicate mode information (e.g., 1320, 1330). For example, appliance 108 can act as a split proxy mode 1320 when client authentication is not required by the server. Likewise, appliance 108 can act as a transparent mode 1330 when client authentication is required by the server. For example, split proxy mode 1320 can be indicated, e.g., SPLIT PROXY=Y/N, 1321). Transparent mode 1330 can be indicated, e.g., TRANSPARENT=Y/N, 1331). Client authentication requirement 1340 can be indicated, e.g., CLIENT_AUTH=Y/N, 1341).

On split proxy mode=Y, lookup table 1300 can include proxy certificate information 1350, premaster secret information 1360, or both. When lookup table 1300 includes proxy certificate information 1350 under split proxy mode, proxy certificate information 1350 can be reused during subsequent full handshake procedure. Reusing proxy certificate information benefits decreasing one or more signalling transactions between appliance 108 and client device 102 while establishing a secure session connection between them.

When lookup table 1300 includes premaster secret information 1360 under split proxy mode, premaster secret information can also be reused during a handshake procedure. Premaster secret information 1360 can be included in client key exchange. Premaster secret information 1360 can used to derive a master secret. Premaster secret information 1360 can have 48 bytes random numbers as exampled in 1361. Reusing premaster secret information 1360 can significantly reduce a number of signalling transactions between appliance 108 and client device 102, and between appliance 108 and the other appliance 108'.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An appliance comprising:
one or more network interfaces configured to facilitate secure communications between a client device and a server, wherein the secure communications involve a plurality of secure session connections comprising a first secure session connection between the client device and the appliance and a second secure session connection between the appliance and another appliance; and
a secure session connection optimizer module comprising a processor configured to:
receive a secure session connection request from the client device,
determine, using information from the secure session connection request, whether a lookup table includes information that client authentication is required by the server,
if the information indicates that client authentication is not required by the server, provide an instruction to the other appliance, and
if the information indicates that client authentication is required by the server, provide the secure connection request to the other appliance over the second secure connection via the appliance decrypting communications received from the first secure session connection using a key shared with the client device, and encrypting the decrypted communications to be sent via the second secure connection using a key shared with the other appliance.

2. The appliance of claim 1, wherein the secure session connection optimizer module is further configured to access the lookup table upon receipt of the secure session connection request.

3. The appliance of claim 1, wherein the information that client authentication is not required indicates that the appliance is acting as a split proxy mode.

4. The appliance of claim 1, wherein the information that client authentication is required indicates that the appliance is acting as a transparent mode.

5. The appliance of claim 1, wherein the instruction indicates that the other appliance is to initiate a secure session handshake procedure between the other appliance and the server.

6. The appliance of claim 1, wherein the secure session connections are established based on a secure session layer (SSL) or a transport layer security (TLS) handshake protocol.

7. The appliance of claim 1, wherein the secure session connection optimizer module is further configured to determine, using information from the secure session connection request, whether the lookup table includes certificate information.

8. The appliance of claim 7, wherein the secure session connection optimizer module is further configured to establish the first secure session connection with the client device using the certificate information in response to the secure connection request.

9. The appliance of claim 1, wherein the determination that the lookup table does not include information on client authentication or failing to access the lookup table further comprises the secure session connection optimizer module configured to forward the secure session connection request to the other appliance.

10. The appliance of claim 1, wherein the secure session connection optimizer module is further configured to add an entry in the lookup table, if the entry does not exist for the server, wherein the entry is allocated to store at least one of: mode information, certificate information, information that client authentication is not required by the server, and premaster secret information.

11. The appliance of claim 10, wherein the entry in the lookup table is distinguished based on IP address and port information of the server.

12. The appliance of claim 10, wherein the mode information comprises one of a split proxy mode and a transparent mode.

13. The appliance of claim 1, wherein the determination whether the lookup table does not include information on client authentication further comprises the secure session connection optimizer module configured to:
    receive, from the other appliance, information that client authentication is not required by the server; and
    store the information in the lookup table that client authentication is not required by the server.

14. The appliance of claim 1, wherein the determination whether the lookup table does not include information on client authentication further comprises the secure session connection optimizer module configured to:
    receive, from the other appliance, certificate information;
    establish the first secure session connection using the certificate information in response to the secure connection request; and
    store the certificate information in the lookup table.

15. The appliance of claim 3, wherein the secure session connection optimizer module is further configured to determine whether the lookup table includes premaster secret information, when determining that the appliance is acting as the split proxy mode.

16. The appliance of claim 15, wherein the secure session connection optimizer module is further configured to send the other appliance a request to decrypt client key exchange, based on determining that the lookup table does not include premaster secret information.

17. The appliance of claim 16, wherein the secure session connection optimizer module is further configured to obtain premaster secret information from the decrypted client key exchange.

18. The appliance of claim 17, wherein the premaster secret information is used to derive a master secret, wherein the master secret is used to encrypt or decrypt data.

19. A method comprising:
    facilitating secure communications between a client device and a server, wherein the secure communications involve a plurality of secure session connections comprising a first secure session connection between the client device and the appliance and a second secure session connection between the appliance and another appliance;
    receiving a secure session connection request from the client device;
    determining, using information from the secure session connection request, whether a lookup table includes information that client authentication is required by the server;
    if the information indicates that client authentication is not required by the server, providing an instruction to the other appliance; and
    if the information indicates that client authentication is required by the server, providing the secure connection request to the other appliance over the second secure connection via the appliance decrypting communications received from the first secure session connection using a key shared with the client device, and encrypting the decrypted communications to be sent via the second secure connection using a key shared with the other appliance.

20. The method of claim 19, further comprising accessing to the lookup table upon receipt of the secure session connection request.

21. The method of claim 19, wherein the information that client authentication is not required indicates that the appliance is acting as a split proxy mode.

22. The method of claim 19, wherein the information that client authentication is required indicates that the appliance is acting as a transparent mode.

23. The method of claim 19, wherein the instruction indicates the other appliance to initiate a secure session handshake procedure between the other appliance and the server.

24. The method of claim 19, wherein the secure session connections are established based on a secure session layer (SSL) or a transport layer security (TLS) handshake protocol.

25. The method of claim 19, further comprising determining, using information from the secure session connection request, whether the lookup table includes certificate information.

26. The method of claim 25, further comprising establishing the first secure session connection with the client device using the certificate information in response to the secure connection request.

27. The method of claim 19, further comprising forwarding the secure session connection request to the other appliance, based on determination that the lookup table does not include information on client authentication or failing to access the lookup table.

28. The method of claim 19, further comprising adding an entry in the lookup table, if the entry not existing for the server, wherein the entry is allocated to store at least one of: mode information, certificate information, information that client authentication is not required by the server, and premaster secret information.

29. The method of claim 28, wherein the entry in the lookup table is distinguished based on IP address and port information of the server.

30. The method of claim 28, wherein the mode information comprises one of a split proxy mode and a transparent mode.

31. The method of claim 19, further comprising, based on determination that the lookup table does not include information on client authentication:

receiving, from the other appliance, information that client authentication is not required by the server; and storing the information in the lookup table that client authentication is not required by the server.

32. The method of claim 19, further comprising, based on determination that the lookup table does not include information on client authentication:

receiving, from the other appliance, certificate information;

establishing the first secure session connection using the certificate information in response to the secure connection request; and storing the certificate information in the lookup table.

33. The method of claim 21, further comprising determining whether the lookup table includes premaster secret information, when determining that the appliance is acting as the split proxy mode.

34. The method of claim 33, further comprising sending the other appliance a request to decrypt client key exchange, based on determining that the lookup table does not include premaster secret information.

35. The method of claim 34, further comprising obtaining premaster secret information from the decrypted client key exchange.

36. The method of claim 35, wherein the premaster secret information is used to derive a master secret, wherein the master secret is used to encrypt or decrypt data.

37. A non-transitory computer readable storage medium that stores a set of instructions that is executable by at least one processor of an appliance to cause the appliance to perform a method, the method comprising:

facilitating secure communications between a client device and a server, wherein the secure communications involve a plurality of secure session connections comprising a first secure session connection between the client device and the appliance and a second secure session connection between the appliance and another appliance;

receiving a secure session connection request from the client device;

determining, using information from the secure session connection request, whether a lookup table includes information that client authentication is required by the server;

if the information indicates that client authentication is not required by the server, providing an instruction to the other appliance; and if the information indicates that client authentication is required by the server, providing the secure connection request to the other appliance over the second secure connection via the appliance decrypting communications received from the first secure session connection using a key shared with the client device, and encrypting the decrypted communications to be sent via the second secure connection using a key shared with the other appliance.

38. The non-transitory computer readable storage medium of claim 37, wherein the set of instructions that is executable by the at least one processor of the apparatus to cause the apparatus to further perform: accessing to the lookup table upon receipt of the secure session connection request.

39. The non-transitory computer readable storage medium of claim 37, wherein the information that client authentication is not required indicates that the appliance is acting as a split proxy mode.

40. The non-transitory computer readable storage medium of claim 37, wherein the information that client authentication is required indicates that the appliance is acting as a transparent mode.

41. The non-transitory computer readable storage medium of claim 37, wherein the instruction indicates the other appliance to initiate a secure session handshake procedure between the other appliance and the server.

42. The non-transitory computer readable storage medium of claim 37, wherein the secure session connections are established based on a secure session layer (SSL) or a transport layer security (TLS) handshake protocol.

43. The non-transitory computer readable storage medium of claim 37, wherein the set of instructions that is executable by the at least one processor of the apparatus to cause the apparatus to further perform: determining, using information from the secure session connection request, whether the lookup table includes certificate information.

44. The non-transitory computer readable storage medium of claim 43, wherein the set of instructions that is executable by the at least one processor of the apparatus to cause the apparatus to further perform: establishing the first secure session connection with the client device using the certificate information in response to the secure connection request.

45. The non-transitory computer readable storage medium of claim 37, wherein the set of instructions that is executable by the at least one processor of the apparatus to cause the apparatus to further perform: forwarding the secure session connection request to the other appliance, based on determination that the lookup table does not include information on client authentication or failing to access the lookup table.

46. The non-transitory computer readable storage medium of claim 37, wherein the set of instructions that is executable by the at least one processor of the apparatus to cause the apparatus to further perform: adding an entry in the lookup table, if the entry not existing for the server, wherein the entry is allocated to store at least one of: mode information, certificate information, information that client authentication is not required by the server, and premaster secret information.

47. The non-transitory computer readable storage medium of claim 46, wherein the entry in the lookup table is distinguished based on IP address and port information of the server.

48. The non-transitory computer readable storage medium of claim 46, wherein the mode information comprises one of a split proxy mode and a transparent mode.

49. The non-transitory computer readable storage medium of claim 37, wherein the set of instructions that is executable by the at least one processor of the apparatus to cause the apparatus to further perform, based on determination that the lookup table does not include information on client authentication: receiving, from the other appliance, information that client authentication is not required by the server; and storing the information in the lookup table that client authentication is not required by the server.

50. The non-transitory computer readable storage medium of claim 37, wherein the set of instructions that is executable by the at least one processor of the apparatus to cause the apparatus to further perform, based on determination that the lookup table does not include information on client authentication: receiving, from the other appliance, certificate information; establishing the first secure session connection using the certificate information in response to the secure connection request; and storing the certificate information in the lookup table.

51. The non-transitory computer readable storage medium of claim 39, wherein the set of instructions that is executable by the at least one processor of the apparatus to cause the apparatus to further perform: determining whether the lookup table includes premaster secret information, when determining that the appliance is acting as the split proxy mode.

52. The non-transitory computer readable storage medium of claim 51, wherein the set of instructions that is executable by the at least one processor of the apparatus to cause the apparatus to further perform: sending the other appliance a request to decrypt client key exchange, based on determining that the lookup table does not include premaster secret information.

53. The non-transitory computer readable storage medium of claim 52, wherein the set of instructions that is executable by the at least one processor of the apparatus to cause the apparatus to further perform: obtaining premaster secret information from the decrypted client key exchange.

54. The non-transitory computer readable storage medium of claim 53, wherein the premaster secret information is used to derive a master secret, wherein the master secret is used to encrypt or decrypt data.

* * * * *